US007338367B2

(12) United States Patent
Kaminkow et al.

(10) Patent No.: US 7,338,367 B2
(45) **Date of Patent: *Mar. 4, 2008**

(54) GAMING DEVICE HAVING AN ACCUMULATED AWARD SELECTION BONUS SCHEME

(75) Inventors: Joseph E. Kaminkow, Reno, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 154 days.

This patent is subject to a terminal disclaimer.

(21) Appl. No.: 10/988,165

(22) Filed: Nov. 11, 2004

(65) Prior Publication Data

US 2005/0064929 A1 Mar. 24, 2005

Related U.S. Application Data

(63) Continuation of application No. 10/465,482, filed on Jun. 19, 2003, now Pat. No. 6,817,944, which is a continuation of application No. 09/963,721, filed on Sep. 26, 2001, now Pat. No. 6,602,137.

(51) Int. Cl.
*A63F 13/00* (2006.01)

(52) U.S. Cl. .......................................................... 463/16

(58) Field of Classification Search .................. 463/16, 463/20–22, 25, 42; 273/138.1, 138.2, 139, 273/143 R See application file for complete search history.

(56) References Cited

U.S. PATENT DOCUMENTS

| | | |
|---|---|---|
| 1,527,929 A | 2/1925 | Simons |
| 3,642,287 A | 2/1972 | Lally et al. |
| 4,182,515 A | 1/1980 | Nemeth |
| 4,448,419 A | 5/1984 | Telnaes |
| 4,560,161 A | 12/1985 | Hamano |
| 4,582,324 A | 4/1986 | Koza et al. |

(Continued)

FOREIGN PATENT DOCUMENTS

| | | |
|---|---|---|
| EP | 0688002 A1 | 12/1995 |

(Continued)

OTHER PUBLICATIONS

Bingo Advertisement, written by Casino Data System, published 1998.

(Continued)

*Primary Examiner*—Kim Nguyen
(74) *Attorney, Agent, or Firm*—Bell, Boyd & Lloyd LLP

(57) ABSTRACT

A gaming device having a bonus game, where one embodiment of the gaming device includes a display device; a processor that controls the display device; and several selections including awards and at least one accumulated award. The gaming device provides a player with a number of picks to start a game. The player picks selections attempting to obtain awards. If the player picks an accumulated award, the player receives two or more awards that are associated with selections preferably adjacent to the accumulated award. The player continues to pick selections until there are no picks remaining. In another embodiment, the selections include at least one terminator where a player continues to pick selections until the player picks a terminator or until there are no picks remaining.

101 Claims, 19 Drawing Sheets

U.S. PATENT DOCUMENTS

| | | | | |
|---|---|---|---|---|
| 4,624,459 | A | 11/1986 | Kaufman | |
| 4,695,053 | A | 9/1987 | Vazquez, Jr. et al. | |
| 4,775,155 | A | 10/1988 | Lees | |
| 4,874,173 | A | 10/1989 | Kishishita | |
| 4,991,848 | A | 2/1991 | Greenwood et al. | |
| 5,046,737 | A | 9/1991 | Fienberg | |
| 5,116,055 | A | 5/1992 | Tracy | |
| 5,152,529 | A | 10/1992 | Okada | |
| 5,178,390 | A | 1/1993 | Okada | |
| 5,205,555 | A | 4/1993 | Hamano | |
| 5,315,660 | A | 5/1994 | Anderson et al. | |
| 5,322,295 | A | 6/1994 | Cabot et al. | |
| 5,342,047 | A | 8/1994 | Heidel et al. | |
| 5,344,144 | A | 9/1994 | Canon | |
| 5,380,007 | A | 1/1995 | Travis et al. | |
| 5,437,451 | A | 8/1995 | Fulton | |
| 5,449,173 | A | 9/1995 | Thomas et al. | |
| 5,456,465 | A | 10/1995 | Durham | |
| 5,524,888 | A | 6/1996 | Heidel | |
| 5,536,016 | A | 7/1996 | Thompson | |
| 5,542,669 | A | 8/1996 | Charron et al. | |
| 5,647,798 | A | 7/1997 | Falciglia | |
| 5,722,891 | A | 3/1998 | Inoue | |
| 5,743,524 | A | 4/1998 | Nannicola | |
| 5,769,716 | A | 6/1998 | Saffari et al. | |
| 5,772,509 | A | 6/1998 | Weiss | |
| 5,788,573 | A | 8/1998 | Baerlocher et al. | |
| 5,823,873 | A | 10/1998 | Moody | |
| 5,823,874 | A | 10/1998 | Adams | |
| 5,833,536 | A | 11/1998 | Davids et al. | |
| 5,848,932 | A | 12/1998 | Adams | |
| 5,851,148 | A | 12/1998 | Brune et al. | |
| 5,855,514 | A | 1/1999 | Kamille | |
| 5,882,261 | A | 3/1999 | Adams | |
| 5,902,184 | A | 5/1999 | Bennett et al. | |
| 5,911,418 | A | 6/1999 | Adams | |
| 5,919,088 | A | 7/1999 | Weiss | |
| 5,927,714 | A | 7/1999 | Kaplan | |
| 5,947,820 | A | 9/1999 | Morro et al. | |
| 5,951,397 | A | 9/1999 | Dickinson | |
| 5,980,384 | A | 11/1999 | Barrie | |
| 5,997,401 | A | 12/1999 | Crawford | |
| 6,004,207 | A | 12/1999 | Wilson, Jr. et al. | |
| 6,015,346 | A | 1/2000 | Bennett | |
| 6,033,307 | A | 3/2000 | Vancura | |
| 6,056,642 | A | 5/2000 | Bennett | |
| 6,089,976 | A | 7/2000 | Schneider et al. | |
| 6,089,977 | A | 7/2000 | Bennett | |
| 6,089,978 | A | 7/2000 | Adams | |
| 6,093,102 | A | 7/2000 | Bennett | |
| 6,102,798 | A | 8/2000 | Bennett | |
| 6,113,098 | A | 9/2000 | Adams | |
| 6,120,031 | A | 9/2000 | Adams | |
| 6,126,542 | A | 10/2000 | Fier | |
| 6,146,273 | A | 11/2000 | Olsen | |
| 6,149,156 | A | 11/2000 | Feola | |
| 6,155,925 | A | 12/2000 | Giobbi et al. | |
| 6,159,095 | A | 12/2000 | Frohm et al. | |
| 6,159,097 | A | 12/2000 | Gura | |
| 6,159,098 | A | 12/2000 | Slomiany et al. | |
| 6,162,121 | A | 12/2000 | Morro et al. | |
| 6,168,520 | B1 | 1/2001 | Baerlocher et al. | |
| 6,174,235 | B1 | 1/2001 | Walker et al. | |
| 6,190,254 | B1 | 2/2001 | Bennett | |
| 6,190,255 | B1 * | 2/2001 | Thomas et al. | 463/20 |
| 6,203,429 | B1 | 3/2001 | Demar et al. | |
| 6,224,483 | B1 | 5/2001 | Mayeroff | |
| 6,231,442 | B1 | 5/2001 | Mayeroff | |
| 6,254,481 | B1 | 7/2001 | Jaffe | |
| 6,261,177 | B1 | 7/2001 | Bennett | |
| 6,264,198 | B1 | 7/2001 | Stamper | |
| 6,302,790 | B1 | 10/2001 | Brossard | |
| 6,309,300 | B1 | 10/2001 | Glavich | |
| 6,312,334 | B1 | 11/2001 | Yoseloff | |
| 6,315,660 | B1 | 11/2001 | DeMar et al. | |
| 6,315,664 | B1 | 11/2001 | Baerlocher et al. | |
| 6,319,124 | B1 | 11/2001 | Baerlocher et al. | |
| 6,322,309 | B1 | 11/2001 | Thomas et al. | |
| 6,343,988 | B1 | 2/2002 | Walker et al. | |
| 6,346,043 | B1 | 2/2002 | Colin et al. | |
| 6,347,996 | B1 | 2/2002 | Gilmore et al. | |
| 6,364,766 | B1 | 4/2002 | Anderson et al. | |
| 6,364,767 | B1 | 4/2002 | Brossard et al. | |
| 6,368,218 | B2 | 4/2002 | Angell, Jr. | |
| 6,375,187 | B1 | 4/2002 | Baerlocher et al. | |
| 6,398,644 | B1 | 6/2002 | Perrie et al. | |
| 6,428,412 | B1 | 8/2002 | Anderson et al. | |
| 6,439,995 | B1 | 8/2002 | Hughs-Baird et al. | |
| 6,443,837 | B1 | 9/2002 | Jaffe et al. | |
| 6,464,582 | B1 | 10/2002 | Baerlocher et al. | |
| 6,494,785 | B1 | 12/2002 | Gerrard et al. | |
| 6,506,118 | B1 | 1/2003 | Baerlocher et al. | |
| 6,514,141 | B1 | 2/2003 | Kaminkow et al. | |
| 6,575,830 | B2 | 6/2003 | Baerlocher et al. | |
| 6,582,307 | B2 | 6/2003 | Webb | |
| 6,599,185 | B1 | 7/2003 | Kaminkow et al. | |
| 6,602,137 | B2 * | 8/2003 | Kaminkow et al. | 463/16 |
| 6,609,971 | B2 * | 8/2003 | Vancura | 463/16 |
| 6,685,561 | B2 | 2/2004 | Anderson et al. | |
| 6,796,899 | B2 | 9/2004 | Baerlocher | |
| 6,817,944 | B2 * | 11/2004 | Kaminkow et al. | 463/16 |
| 2001/0054794 | A1 * | 12/2001 | Cole et al. | 273/138.1 |
| 2002/0025844 | A1 | 2/2002 | Casey et al. | |
| 2002/0037764 | A1 | 3/2002 | Anderson et al. | |
| 2002/0072402 | A1 | 6/2002 | Baerlocher | |
| 2002/0142822 | A1 | 10/2002 | Baerlocher et al. | |
| 2002/0155883 | A1 | 10/2002 | Baerlocher | |
| 2002/0183109 | A1 | 12/2002 | McGahn et al. | |
| 2003/0027623 | A1 | 2/2003 | Rose | |
| 2003/0040360 | A1 | 2/2003 | Kaminkow | |
| 2003/0045348 | A1 | 3/2003 | Palmer et al. | |
| 2003/0045350 | A1 | 3/2003 | Baerlocher et al. | |
| 2003/0054875 | A1 | 3/2003 | Marks et al. | |
| 2003/0060259 | A1 | 3/2003 | Mierau et al. | |
| 2003/0060260 | A1 | 3/2003 | Gerrard et al. | |
| 2003/0064795 | A1 | 4/2003 | Baerlocher et al. | |
| 2003/0078093 | A1 | 4/2003 | Simms et al. | |
| 2003/0078096 | A1 | 4/2003 | Kaminkow et al. | |
| 2003/0087693 | A1 | 5/2003 | Baerlocher et al. | |
| 2003/0119583 | A1 | 6/2003 | Kaminkow et al. | |
| 2003/0157982 | A1 | 8/2003 | Gerrard et al. | |
| 2003/0162578 | A1 | 8/2003 | Baerlocher et al. | |
| 2003/0162579 | A1 | 8/2003 | Gauselmann | |
| 2003/0162584 | A1 | 8/2003 | Hughs-Baird et al. | |
| 2003/0195027 | A1 | 10/2003 | Baerlocher et al. | |
| 2003/0216165 | A1 | 11/2003 | Singer et al. | |
| 2004/0201169 | A1 | 10/2004 | Schaefer et al. | |
| 2004/0204229 | A1 | 10/2004 | Walker et al. | |
| 2005/0033461 | A1 | 2/2005 | Gerrard et al. | |
| 2005/0037840 | A1 | 2/2005 | Baerlocher | |
| 2005/0054434 | A1 | 3/2005 | Baerlocher et al. | |
| 2005/0059461 | A1 | 3/2005 | Ching et al. | |

FOREIGN PATENT DOCUMENTS

| | | | |
|---|---|---|---|
| EP | 0874337 | A1 | 10/1998 |
| EP | 0926645 | A2 | 6/1999 |
| EP | 0944030 | A2 | 9/1999 |
| EP | 0945837 | A2 | 9/1999 |
| EP | 0981119 | A2 | 2/2000 |
| EP | 0 984 408 | A2 | 3/2000 |
| EP | 0 984 409 | A2 | 3/2000 |
| GB | 2 144 644 | A | 8/1983 |
| GB | 2 242 300 | A | 9/1991 |

| | | | |
|---|---|---|---|
| GB | 2 248 403 | A | 4/1992 |
| GB | 2 262 642 | A | 6/1993 |
| WO | WO 97/32285 | | 9/1997 |
| WO | WO 00/12186 | | 3/2000 |
| WO | WO 01/19476 | | 3/2001 |

OTHER PUBLICATIONS

Crazy Fruits Article, written by Atronic, published 2001.
Enchanted Unicorn-Unicorn Bonus Advertisements, written by IGT, published 2001.
Evil Kneivel Advertisement, written by IGT, published 2001.
Five Card Instant Bingo Advertisement, written by IGT, published 2000.
Fortune Cookie Advertisement, written by IGT, published 2000.
Jackpot Party Brochures and Articles, written by WMS Gaming, Inc., published 1998.
Money to Burn Advertisement, written by WMS Gaming, Inc., undated.
Piggy Banking and Big Bang Piggy Banking Brochures, written by WMS Gaming, Inc., undated.
Regis Cash Club Advertisement, written by IGT, published 2000.
Texas Tea Advertisement, written by IGT, published 2000.
Top Dollar Brochure, written by IGT, undated.
South Park Advertisement written by IGT, published in 2000.
Stooges II Article written by Strictly Slots, published in Jun. 2001.
Addams Family Advertisement and Article, written by IGT, published 2000.
Austin Powers Brochure, written by IGT, published 2001.
Bonus Spin Advertisement written by IGT, published prior 2000.
Jumble Article, written by Strictly Slots, published 2000.
Jumble Description on WMS Gaming, Inc. website (www.wmsgaming.com), Printed Mar. 21, 2001.
On the Money Article written by Strictly Slots, published in 2000.
Polly & Ranger Brochure, written by Anchor Games, published 2000.
Price is Right Advertisement written by IGT, published in 2001.
Price is Right Showcase Showdown Description, schuminweb.com (website), printed Mar. 16, 2001.
Psycho Cash Beast Advertisement written by IGT, published in 1999.
Sphinx Advertisement, written by Atronic Casino Technology, Ltd., published 1997.
Take Your Pick Advertisement, written by IGT/Anchor Gaming, published 1999.
Take Your Pick Article, written by Strictly Slot, published 2001.
Top Dollar Advertisement, written by IGT, published 1998.
Top Gear Brochure, written by Aristocrat, published 1995.
Wheel of Fortune Advertisement written by IGT, published 1997.
Winning Streak Advertisement written by Aristocrat, published in 1994.

* cited by examiner

GAMING DEVICE HAVING AN ACCUMULATED AWARD SELECTION BONUS SCHEME

PRIORITY CLAIM

This application is a continuation of, claims priority to and the benefit of U.S. patent application Ser. No. 10/465,482, file Jun. 19, 2003, now issued as U.S. Pat. No. 6,817,944, which is a continuation of and claims the benefit of U.S. patent application Ser. No. 09/963,721, filed Sep. 26, 2001, now issued as U.S. Pat. No. 6,602,137, the entire contents of which are incorporated herein.

CROSS REFERENCE TO RELATED APPLICATIONS

This application is related to the following commonly-owned patent applications: "GAMING DEVICE HAVING AN ACCUMULATED AWARD SYMBOL," Ser. No. 10/158,545, now U.S. Pat. No. 6,958,013; "GAMING DEVICE HAVING AN ACCUMULATED AWARD SYMBOL," Ser. No. 10/987,510, now U.S. Pat. No. 7,104,888; "GAMING DEVICE HAVING AN ACCUMULATED AWARD SYMBOL," Ser. No. 10/987,457, now U.S. Pat. No. 7,056,214; "GAMING DEVICE HAVING AN ACCUMULATED AWARD SYMBOL," Ser. No. 11/421,963, now pending; "GAMING DEVICE HAVING A SELECTABLE COMBINATION BONUS SCHEME," Ser. No. 10/630,876, now pending; and "GAMING DEVICE HAVING AN ACCUMULATED AWARD SYMBOL," Ser. No. 10/987,330.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having an accumulated award selection bonus scheme wherein the accumulated award includes a plurality of other awards.

BACKGROUND OF THE INVENTION

Gaming device manufacturers constantly strive to make gaming devices that provide as much enjoyment and excitement to players as possible. Gaming devices such as slot machines, having primary and secondary or bonus games or schemes are well known. Providing a bonus game in which a player has an opportunity to win potentially large awards or credits in addition to the awards associated with the base or primary game of the gaming device is one way to enhance player enjoyment and excitement.

Gaming devices having bonus games generally employ a triggering event that occurs during play of the base game. The triggering event temporarily stalls or halts the base game play and enables a player to enter a second, different game, which is the bonus game. The player plays the bonus game, likely receives an award, and returns to the base game. In most instances, the bonus game is relatively short in relation to the time that the player spends repeatedly playing the base game.

Known gaming machines have bonus schemes in which the player has one or more opportunities to choose a particular selection or symbol from a group of symbols. When a player chooses a symbol, the game will either award the player a bonus value or terminate the bonus round. The outcome, thus, depends upon the particular symbol selected by the player. In such games, when the player selects a symbol that awards a bonus value (hereinafter referred to as "award indicator"), the player receives the value, and the player has another chance to select another symbol. Each time the player selects an award indicator, the game prompts the player to make another selection. The bonus game continues and the player may choose another symbol. The player then selects another symbol, and this process continues until the player selects a symbol which terminates the bonus game (hereinafter referred to as a "terminator"). When the player selects a terminator, typically the game ends and the player collects any bonus values that the player accumulated in that bonus round. In this type of game, the potential amount of the award is limited by the terminators.

While such bonus schemes offer advantages in player appeal and excitement, there is a continuing need to develop new types of bonus games that allow players to accumulate larger awards and increase the level of player excitement and enjoyment.

SUMMARY OF THE INVENTION

The present invention relates in general to a gaming device, and more particularly to a gaming device having an accumulated award selection bonus scheme. The game displays a plurality of selections to the player. In one embodiment, an award or an accumulated award is associated with each selection. The game provides the player with a number of picks of the selections. If the player picks a selection that has an associated award, the player receives that associated award. If the player picks a selection that has an accumulated award, the player receives an accumulated award based on a plurality of selections related to or associated with the accumulated award selection. In one embodiment, the accumulated award includes the awards that are associated with the selections that are directly adjacent to the accumulated award selection. The player continues to pick selections until the player has no remaining picks. In one alternative embodiment, the game includes one or more terminators associated with the selections. In this embodiment, the player picks selections until there are no picks remaining or until the player selects a selection having a terminator associated with the selections. In one embodiment, the selections are arranged in a grid wherein the accumulated award includes the awards associated with the selections in the grid which are adjacent to the accumulated award selections.

In a further embodiment, the game displays a plurality of sequential selection sets to a player. The selection sets include awards, accumulated awards, transformers, promoters and terminators. As indicated above, an accumulated award provides several awards to the player where the awards are a combination of awards from associated selections. As indicated above, a terminator ends the game. A transformer changes or transforms a terminator into an accumulated award. If a player picks the transformer selection, the player keeps or banks the transformer until a terminator is picked. When a terminator is picked, the transformer changes the terminator into an accumulated award. A promoter enables a player to skip a selection set and make another pick from the plurality of selections in the next or a subsequent selection set. The player's goal is to obtain as many awards as possible before picking a selection having an associated terminator.

It is therefore an advantage of the present invention to provide a gaming device with an accumulated award selection bonus game.

A further advantage of the present invention is to provide a bonus game that enables players to accumulate larger awards from a single selection.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
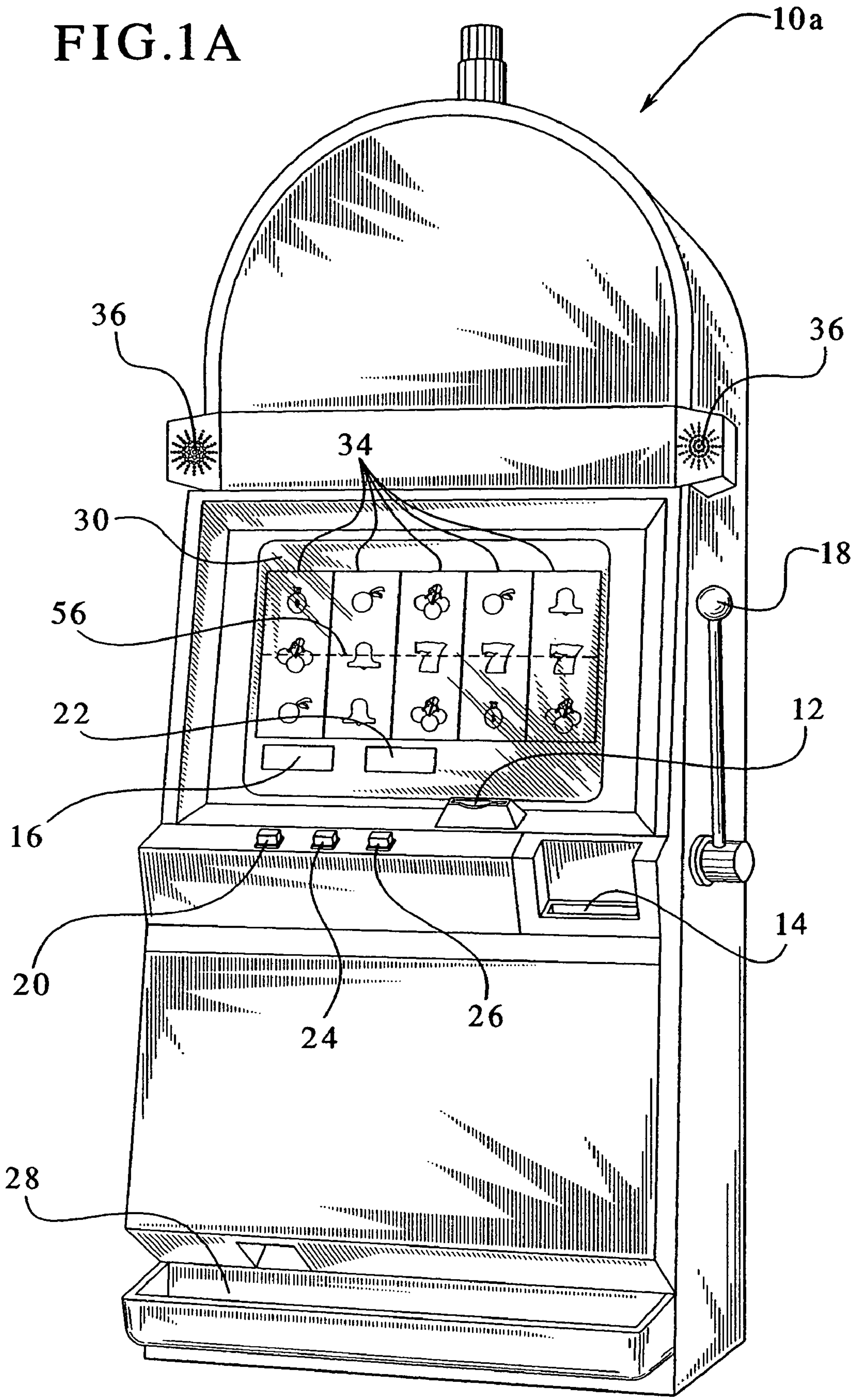
FIG. 1A is front plan view of one embodiment of the gaming device of the present invention.
Figure 1B:
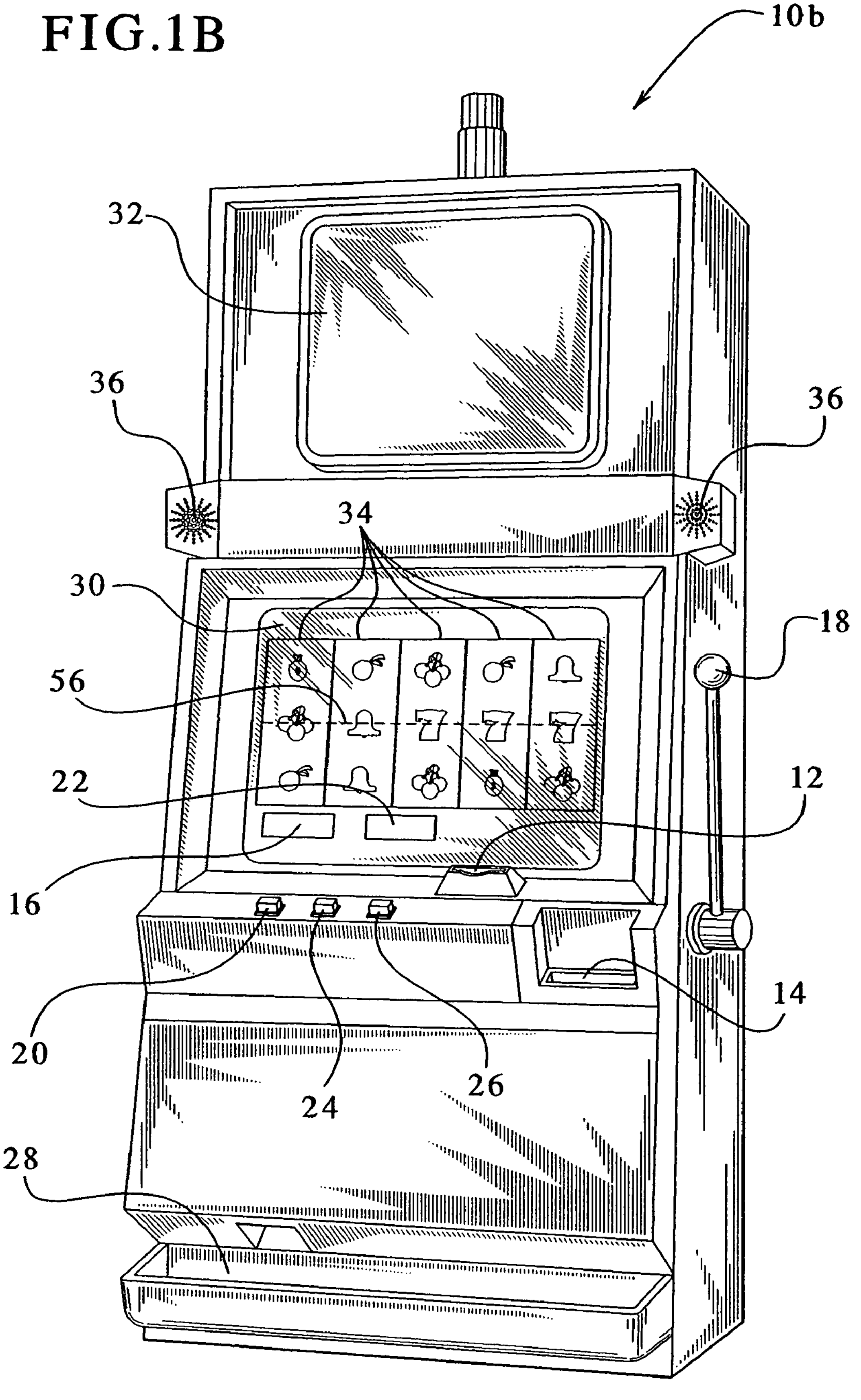
FIG. 1B is front plan view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of their bonus triggering events and any of the bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player who starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
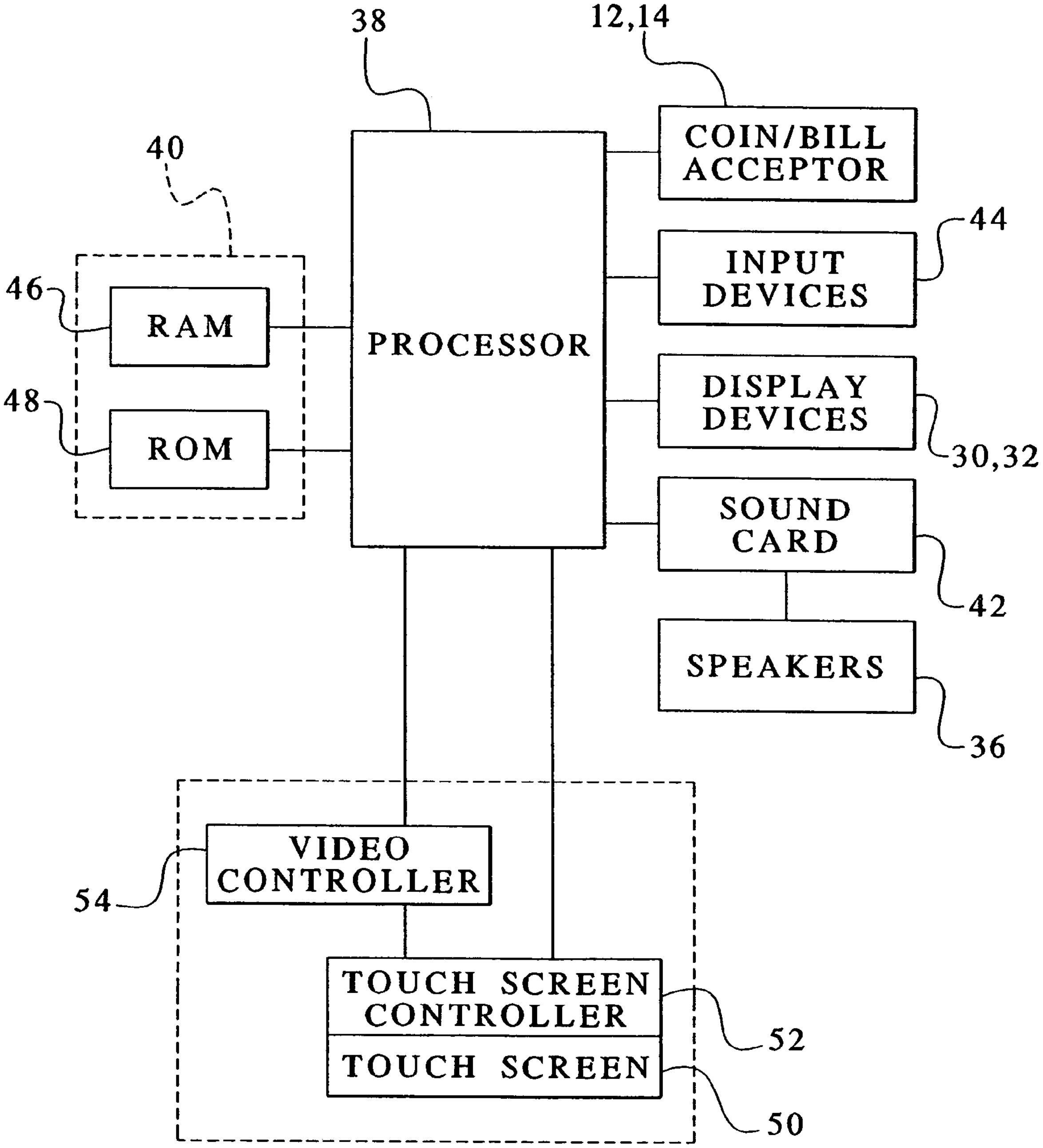
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Bonus Game

Figure 3:
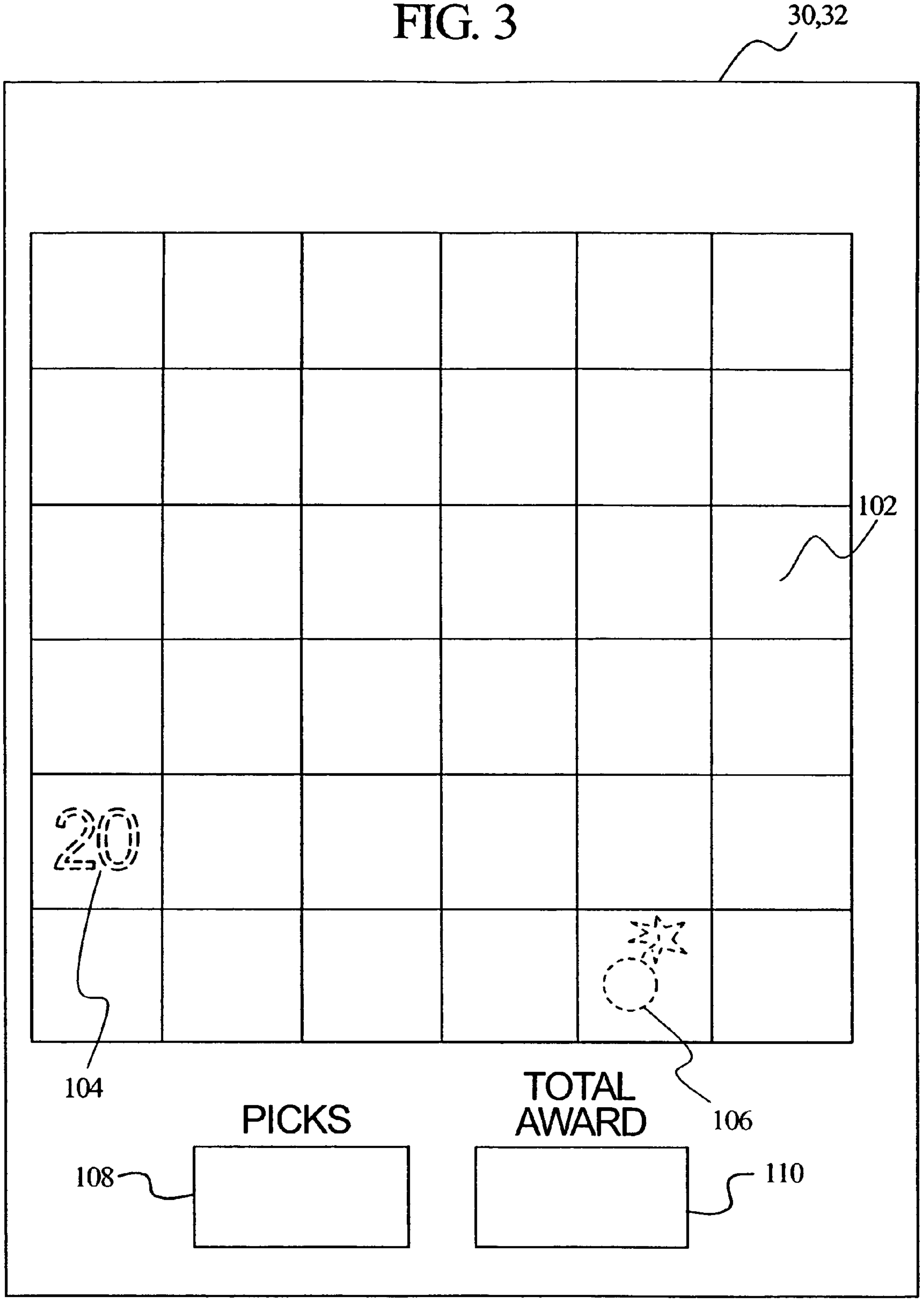
FIG. 3 is an enlarged front elevation view of a display device displaying a plurality of selections of one embodiment of the present invention.

Referring now to FIG. 3, one embodiment of the present invention is shown containing the elements of the present invention. The gaming device displays a plurality of masked selections 102 to a player. In one embodiment, the selections are arranged in an M by N matrix, where M equals the number of rows and N equals the number of columns in the matrix. Furthermore, M and N are integers having a value of one or greater. However, it should be appreciated that the plurality of selections may be configured into any shape or design as desired. Each selection 102 includes either an associated award 104 (shown in phantom) or an associated accumulated award 106 (shown in phantom). The award 104 may be designated by a number or any other symbol as desired. Similarly, the accumulated award may be designated by a symbol, number, color or any other designation as desired. The player begins the game by picking one of the masked selections 102. Once a masked selection is picked, the selection reveals an award 104 or an accumulated award 106 to the player. The selection remains highlighted and visible throughout the game.

The gaming device includes a selector (such as a touch screen or electromechanical device as indicated above) which is connected to or in communication with the processor which enables the player to select the selections.

If the player picks an award 104, they receive the value of the award. In one embodiment, the award is designated by a number such as a number of credits as shown in FIG. 3. However, it should be appreciated that the award may be a symbol, picture, sound or other designation that is linked to an award value or other prize. Once picked, the award value is transferred to an award display 110. The award display 110 indicates the accumulated value of all awards obtained by a player in a game.

The player may pick a selection that reveals an accumulated award 106. The accumulated award turns a single player selection into a larger award than associated with the selection picked by the player. When a player picks a selection that reveals an accumulated award in one embodiment, the player receives the award values for all of the selections that are adjacent to the selection having the accumulated award. In some circumstances, as in FIG. 3, an accumulated award is not completely surrounded by selections. In this situation, the player receives the award values for the selections that are adjacent to the selection having the accumulated award. The player does not receive awards for adjacent positions that do not include selections 102. Thus in FIG. 3, the player would receive the accumulated awards from the selections directly on the left, right, top of and diagonal to the selection having the accumulated award 106 because the accumulated award is located along an edge of the matrix.

The accumulated award may be designated by any symbol, number, sound or character as desired by the game implementor. Preferably, the accumulated award is designated by a symbol or shape that corresponds with the theme of the game. Also, it should be appreciated that the accumulated award may include other values besides the award values of the adjacent selections. The accumulated award may be an award associated with the selection having the accumulated award, and may also include the awards from the selections that are in the same row or column as the selection having the accumulated award in the embodiment where the selections are in a column and row format. The accumulated award may also include any defined grouping of selections as desired by the implementor. For example, the accumulated award may include the awards from selections that are diagonal to the accumulated award, or only the selections that are below the accumulated award, if any. An accumulated award may also include another accumulated award, triggered by the first accumulated award.

The pick display 108 indicates how many picks are remaining in a game. Because the player starts a game with a limited number of picks, the player will continue to pick selections until there are no picks remaining in the game as displayed by pick display 108. When pick display 108 equals zero, the game ends. The player's goal is to accumulate as many awards as possible before running out of picks. In an alternative embodiment, a terminator is also associated with the one or more of the selections having the accumulated awards. When a selection having an accumulated award and a terminator is selected, the accumulated award is provided to the player and the game ends. One or more anti-terminators which are accumulated by the processor may be employed to nullify the effect of a terminator associated with one of the selections.

Now referring to FIGS. 4A through 4F, an example game of one embodiment of the present invention is illustrated. In the beginning of the bonus game shown in FIG. 4A, a plurality of masked selections 102 are displayed to the player on the display device 30 or 32 (see FIGS. 1A and 1B). In this example, the selections 102 are arranged in a M by N matrix where M and N both equal six. However, it should be appreciated that M and N do not have to be equal and both M and N are integers having values of one or greater. Each masked selection 102 includes an award or an accumulated award.

The player starts the game with five picks as shown in pick display 108. Thus, the player will pick five selections in the game. It should be appreciated that an award may include additional picks, opportunities, or other awards that extend the game. The pick display 108 will include any additional picks that the player receives during the game. The player picks selections until all of their original and additional picks are gone.

The player initially does not have any awards in the game as indicated by award display 110. In some games, the player may have an award or awards to start a game. The awards are acquired in previous games and remain with the player until the player is done playing the gaming device. However, the player starts out this game with zero and will attempt to obtain awards while picking selections in the game.

Figure 4A:
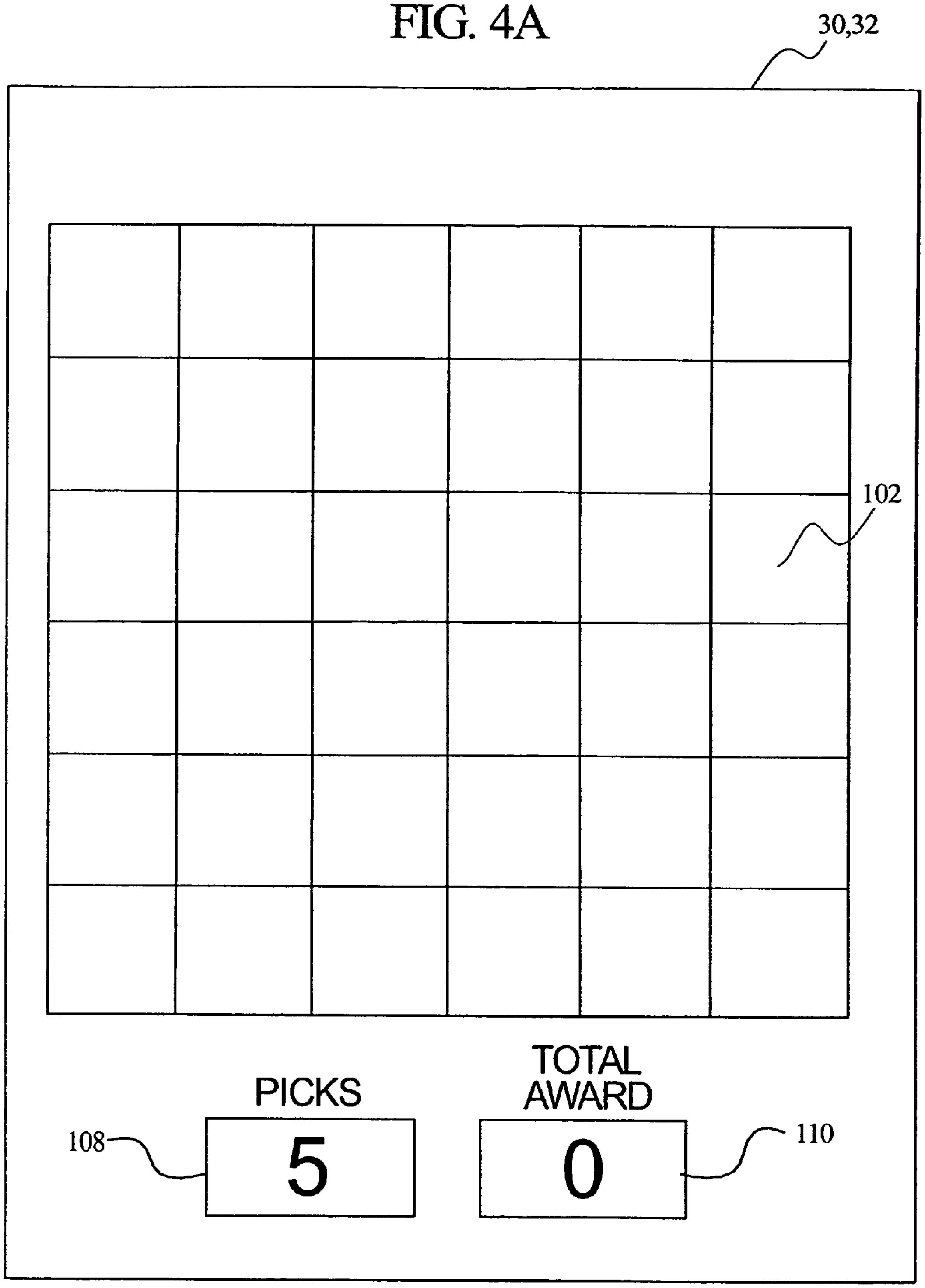
FIG. 4A is an enlarged front elevation view of the plurality of selections displayed at the start of a game.
Figure 4B:
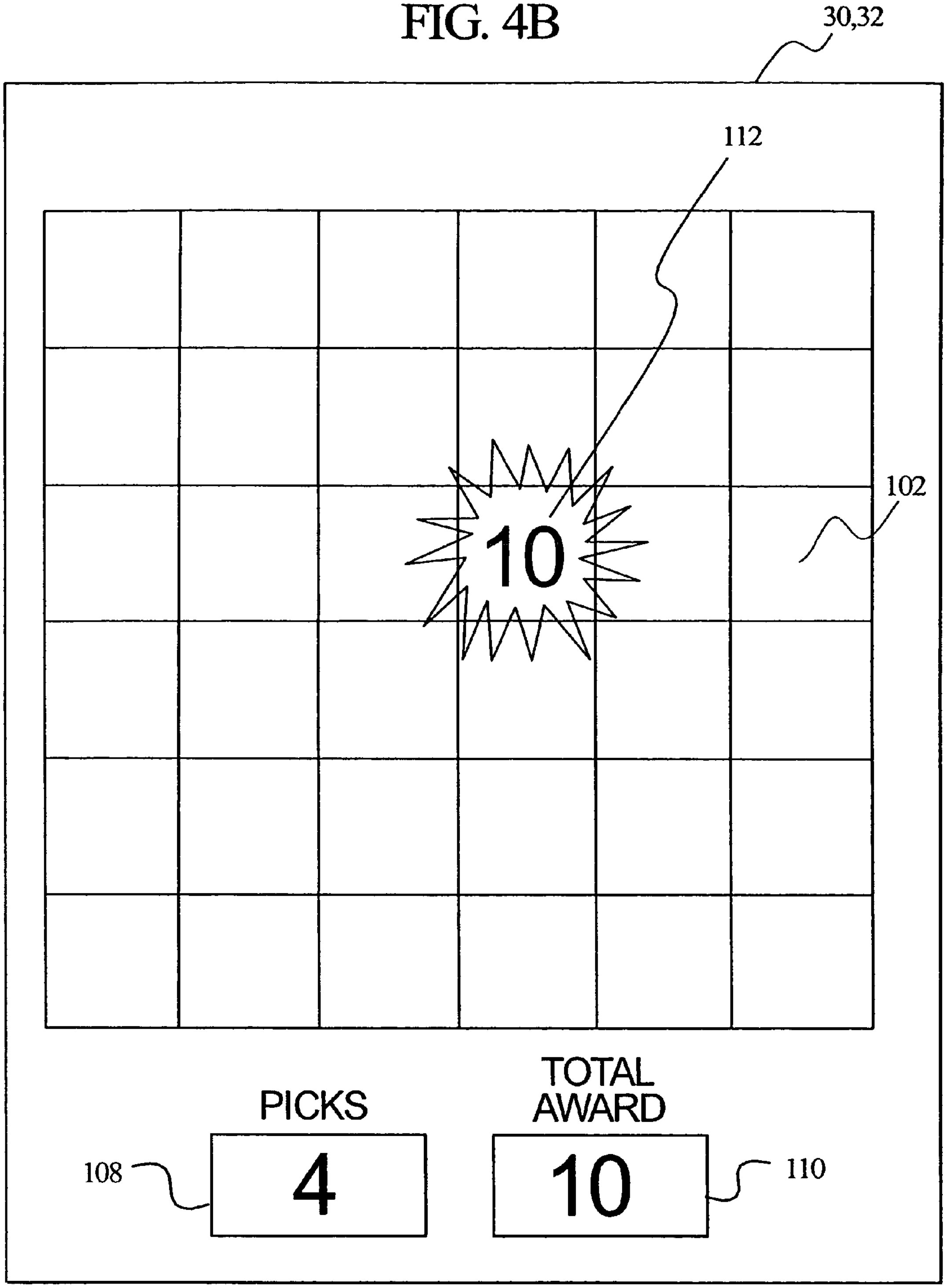
FIG. 4B is an enlarged front elevation view of the display device illustrating a first pick by a player.

Referring now to FIG. 4B, the player picks a first selection 112 from the plurality of selections 102. The first selection reveals an award with a value of ten. The player receives this award as indicated by award display 110. Also, the player now has four picks remaining as shown by pick display 108. Although the player received an award, their goal is to obtain several awards before the game ends. Thus, the player is hoping to pick a selection with an accumulated award because the accumulated award will provide multiple awards to the player.

Figure 4C:
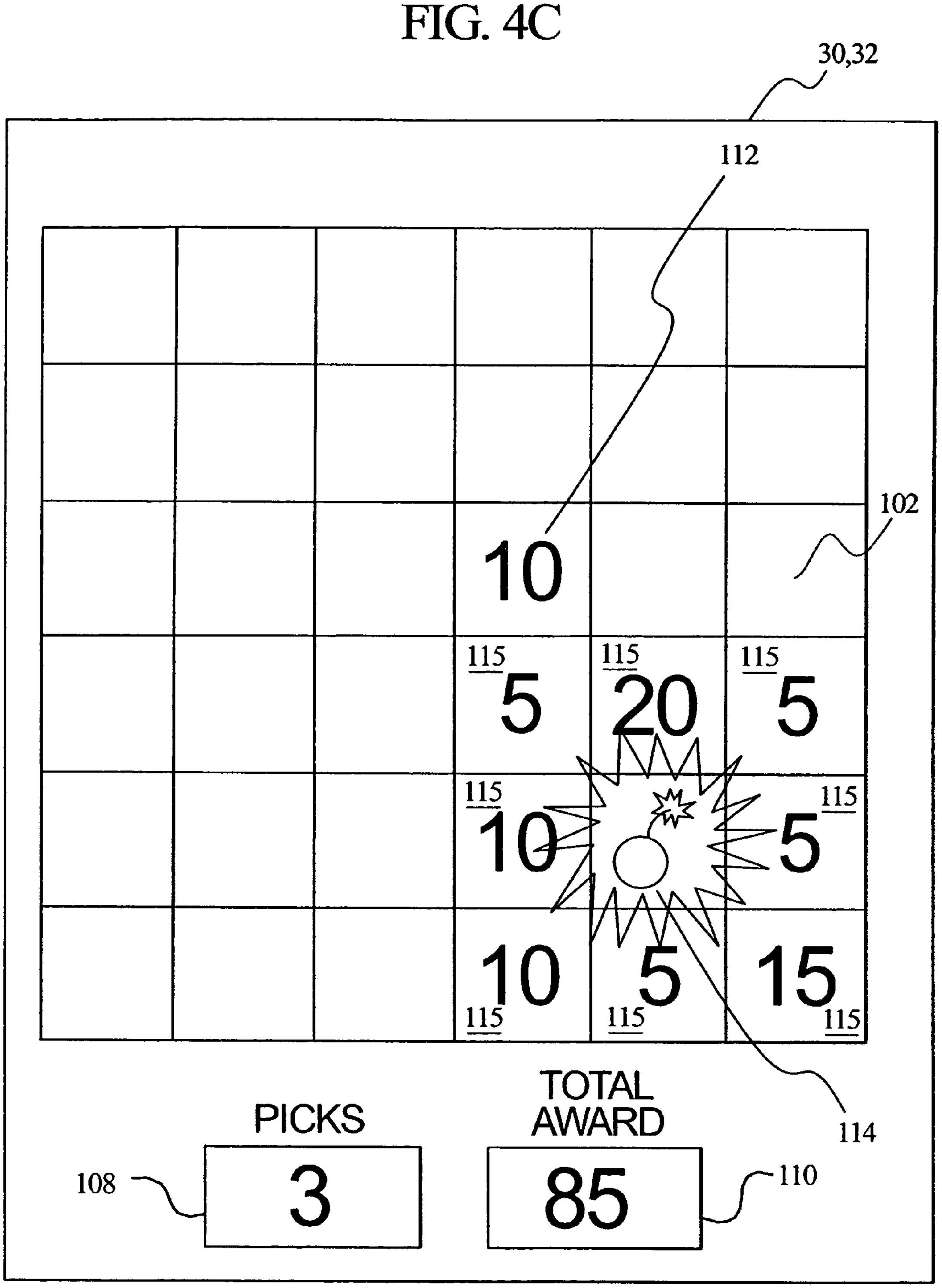
FIG. 4C is an enlarged front elevation view of the display device illustrating a second pick by a player that includes an accumulated award.

In FIG. 4C, the player obtains an accumulated award with the second pick of a selection. The accumulated award 114 reveals all of the awards associated with selections 115 related to and in this embodiment adjacent to the selection picked by the player having the accumulated award. The accumulated award equals the sum of the awards associated with the adjacent selections. The accumulated award is transferred to the award display 110. As a result, the player's total award for the game increases substantially. Prior to picking the accumulated award 114, the player had a total award of ten. After obtaining the accumulated award, the player has a total award of eighty-five. The accumulated award provides a much larger award to a player and increases the player's excitement and interest in the game. The player now has three picks remaining as shown in pick display 108 and the player will continue to pick selections to obtain more awards.

Figure 4D:
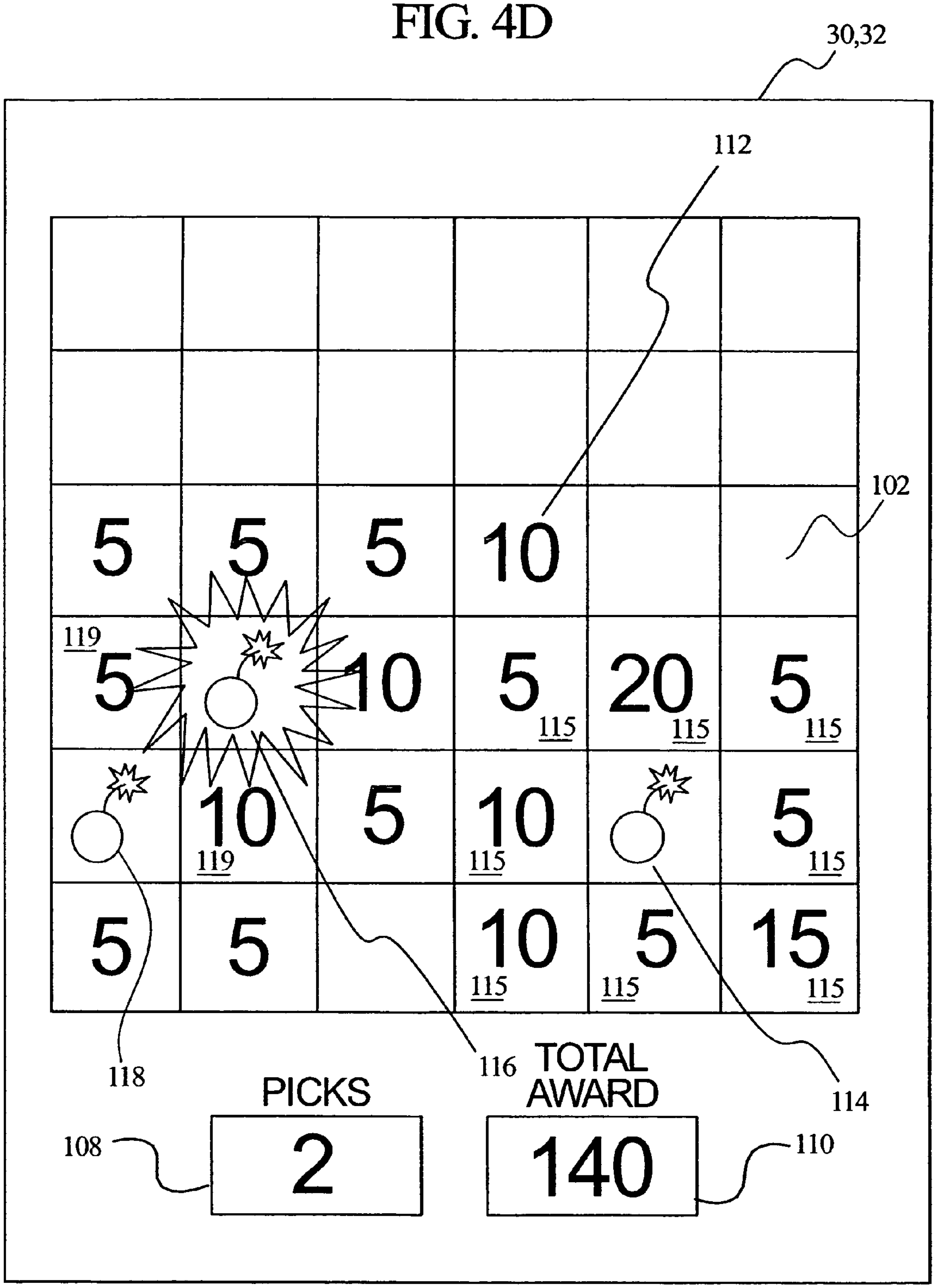
FIG. 4D is an enlarged front elevation view of the display device illustrating a third pick by a player that includes multiple accumulated awards.

Referring to FIG. 4D, the player makes their third pick in the game. Again, the player picks a selection 102 that reveals an accumulated award 116. Now, the player obtains the awards associated with the selections adjacent to the selection having the accumulated award 116. One of the selections adjacent to the selection having the accumulated award also has an associated accumulated award 118. In this case, the player receives the award values of the selections adjacent to the selections with both accumulated awards 116 and 118, respectively. The total award value of the accumulated award associated with selection 116 is fifty-five, which includes the award value, if any, of the accumulated award 118. After adding this total to the total award for the game, the player has a total award value of one hundred forty as shown in award display 110. The player has two picks remaining in the game as indicated by the pick display 108.

In the above embodiment, an accumulated award 116 revealed another accumulated award 118. Each award associated with the selections adjacent to the accumulated awards are provided to the player. Overlapping awards 119 are counted one time. Therefore, the total award for picking the selection having the accumulated award 116 is fifty-five (where the accumulated awards do not have associated awards). In an alternative embodiment, the overlapping awards 119 are counted twice. The player receives an award value of fifteen for the overlapping awards 119 after picking the accumulated award 116. Then the player receives another award of fifteen for the same overlapping awards 119 associated with the second accumulated award 118. Therefore in the alternative embodiment, the player receives a total award of seventy for picking the accumulated award 116. It should also be appreciated that each accumulated award could include an award associated with the selection of the accumulated award symbol.

A player receives a much larger award for each accumulated award. Therefore, a game that reveals multiple accumulated awards after only one pick by a player creates enhanced levels of player excitement. It should be appreciated that the number of accumulated awards is only limited by the number of selections. Each accumulated award may reveal zero, one or more accumulated awards in addition to awards of related selections.

Figure 4E:
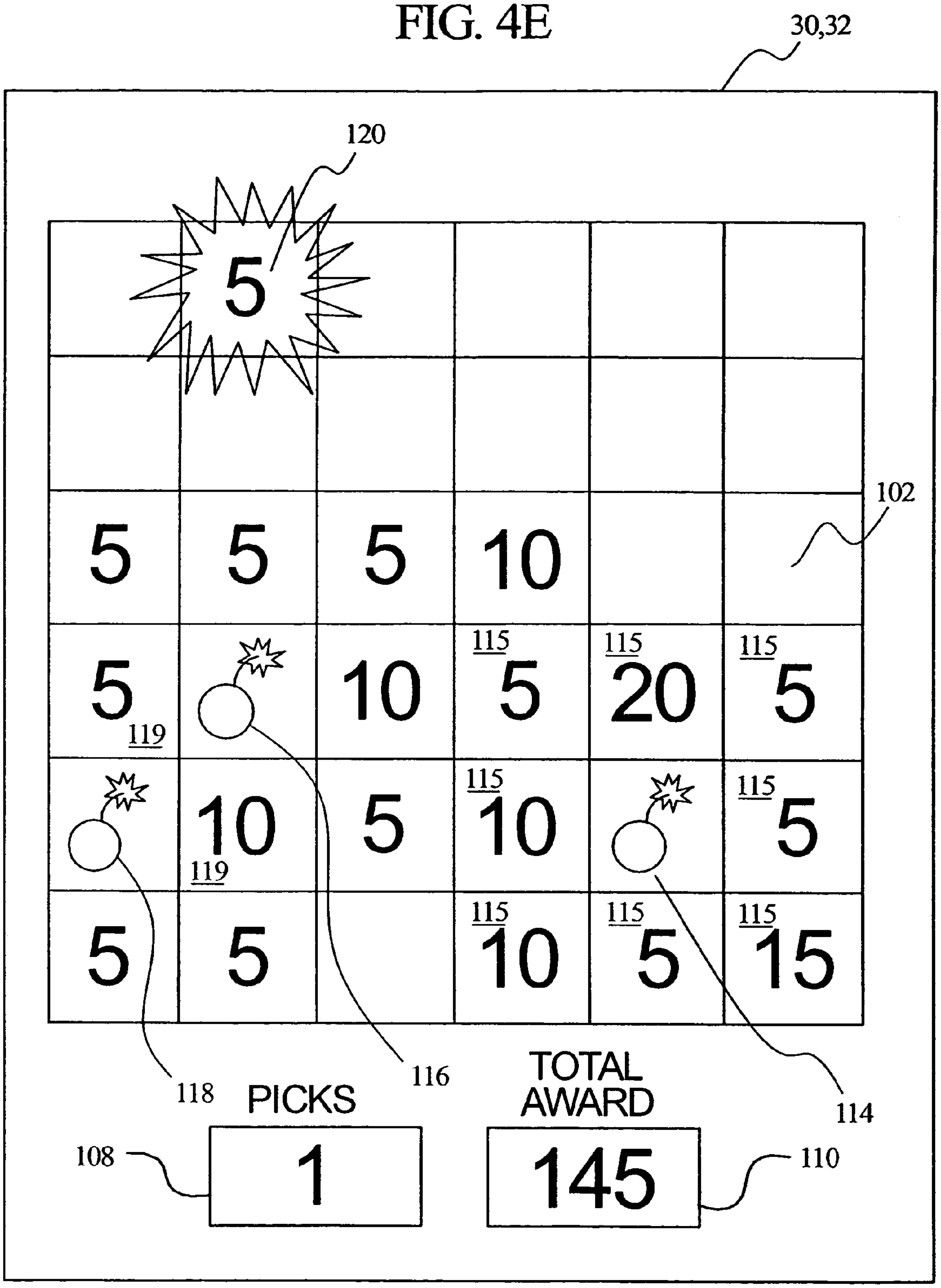
FIG. 4E is an enlarged front elevation view of the display device illustrating a fourth pick by a player.

In FIG. 4E, the player picks another selection 120 from the plurality of selections 102. The selection 120 reveals an award of five. Because the player did not obtain an accumulated award, the player receives an award of five for this pick. The award value of five is added to the player's total award for the game to give the player a new total award of one hundred forty-five as shown in award display 110. The player has one pick remaining in the game as indicated by pick display 108.

Figure 4F:
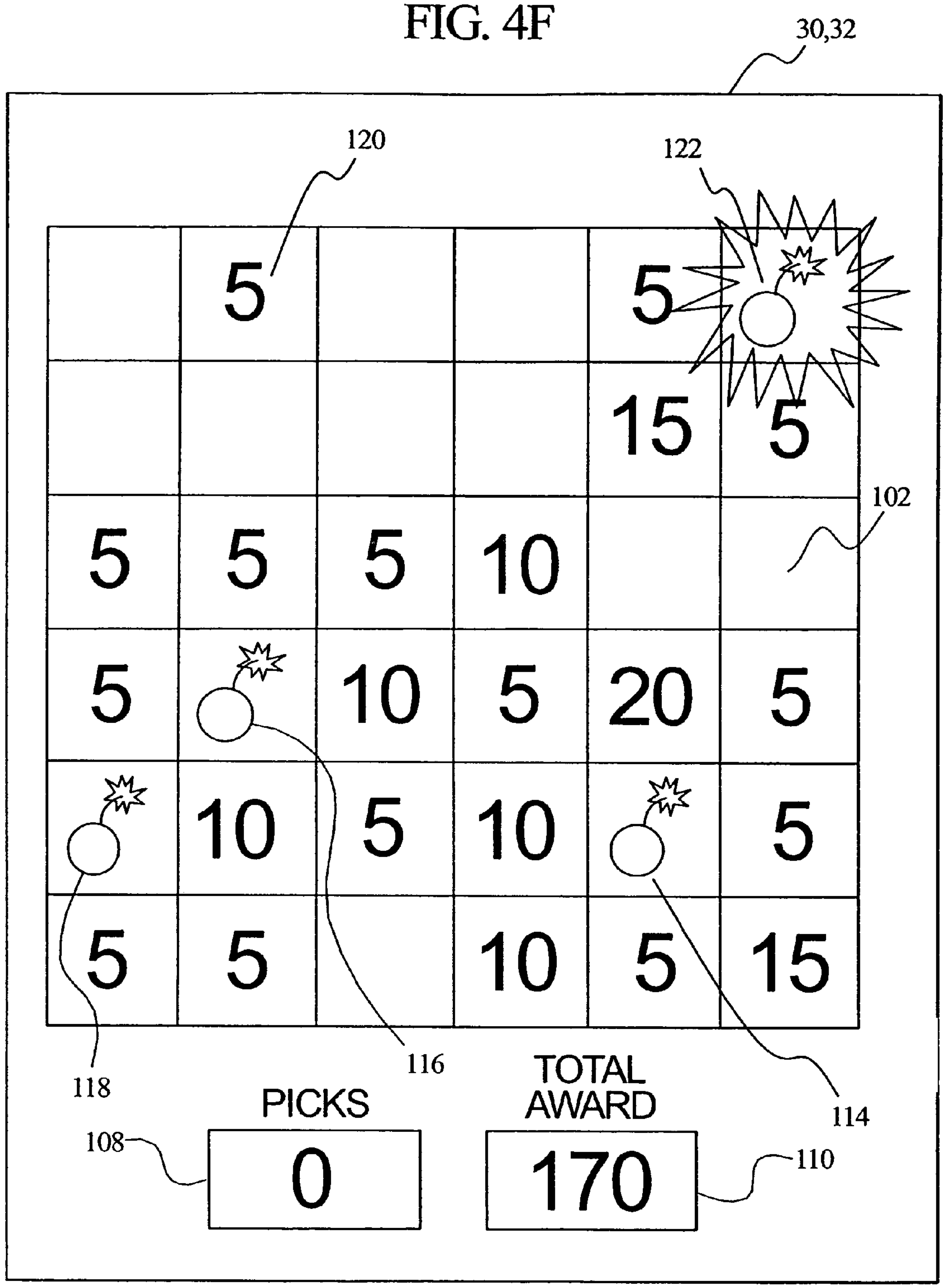
FIG. 4F is an enlarged front elevation view of the display device illustrating a fifth and final pick by a player.

Referring now to FIG. 4F, the player makes their final pick in the game and picks selection 122, which reveals an accumulated award. The accumulated award is located in a corner of the matrix. Thus, the player receives the awards associated with the selections related to or adjacent to the selection having the accumulated award. The total value of the three adjacent selections in the matrix is twenty-five. This award is added to the player's total award which is one hundred seventy as shown in award display 110. The player is out of picks as indicated by pick display 108 and therefore the game ends.

Figure 5:
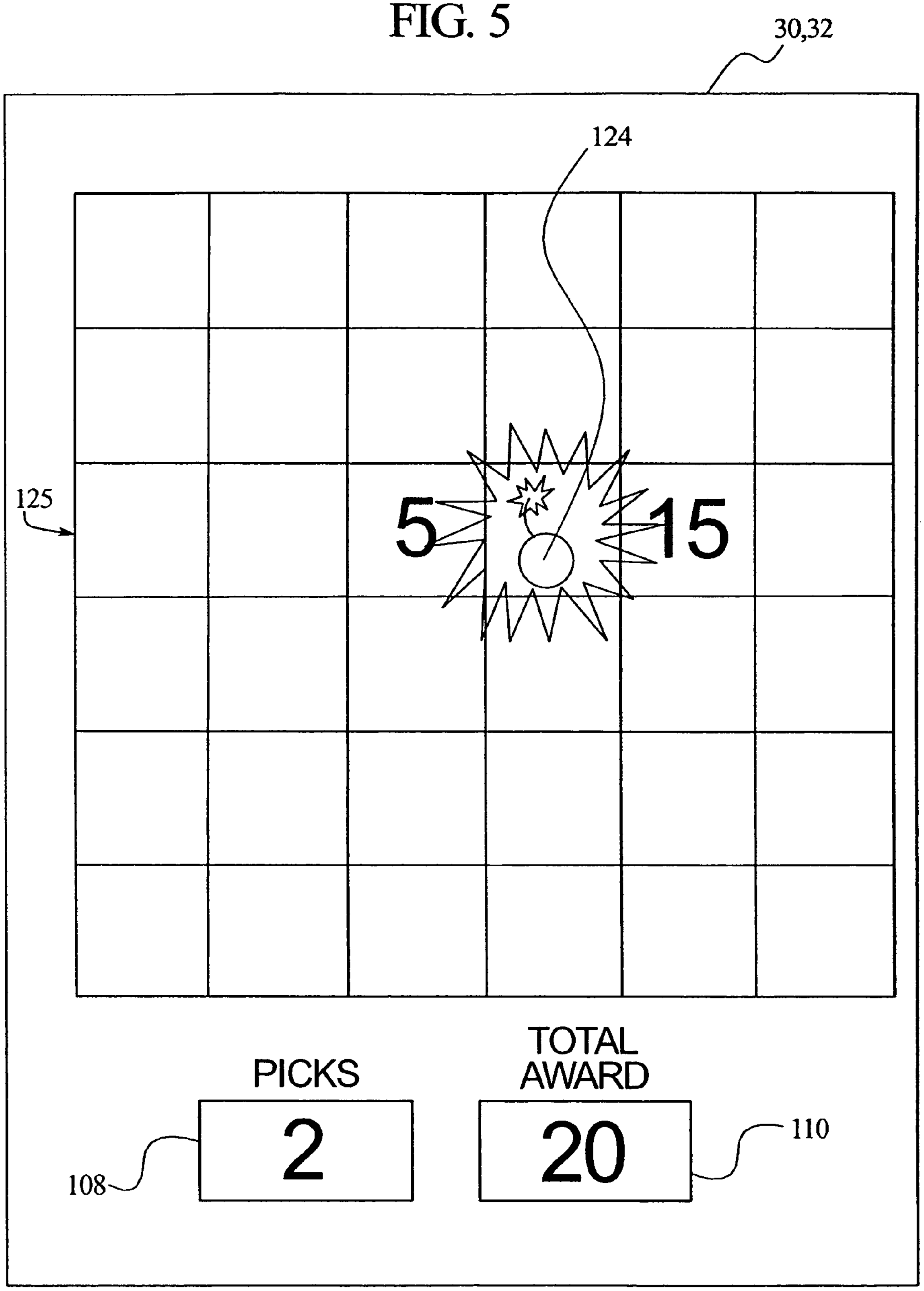
FIG. 5 is an enlarged front elevation view of an alternative embodiment of the present invention wherein the display device illustrates a pick by a player that accumulates awards from a row of selections.

Referring to FIG. 5, another embodiment of the present invention is illustrated where the accumulated award includes the awards associated with selections that are in the same row as the picked selection having the accumulated award. This figure shows how an implementor could change the awards revealed by an accumulated award. Here, the player picks the selection having the accumulated award 124, which in turn reveals the adjacent selections in row 125. The accumulated award equals twenty as shown in award display 110.

Figure 6:
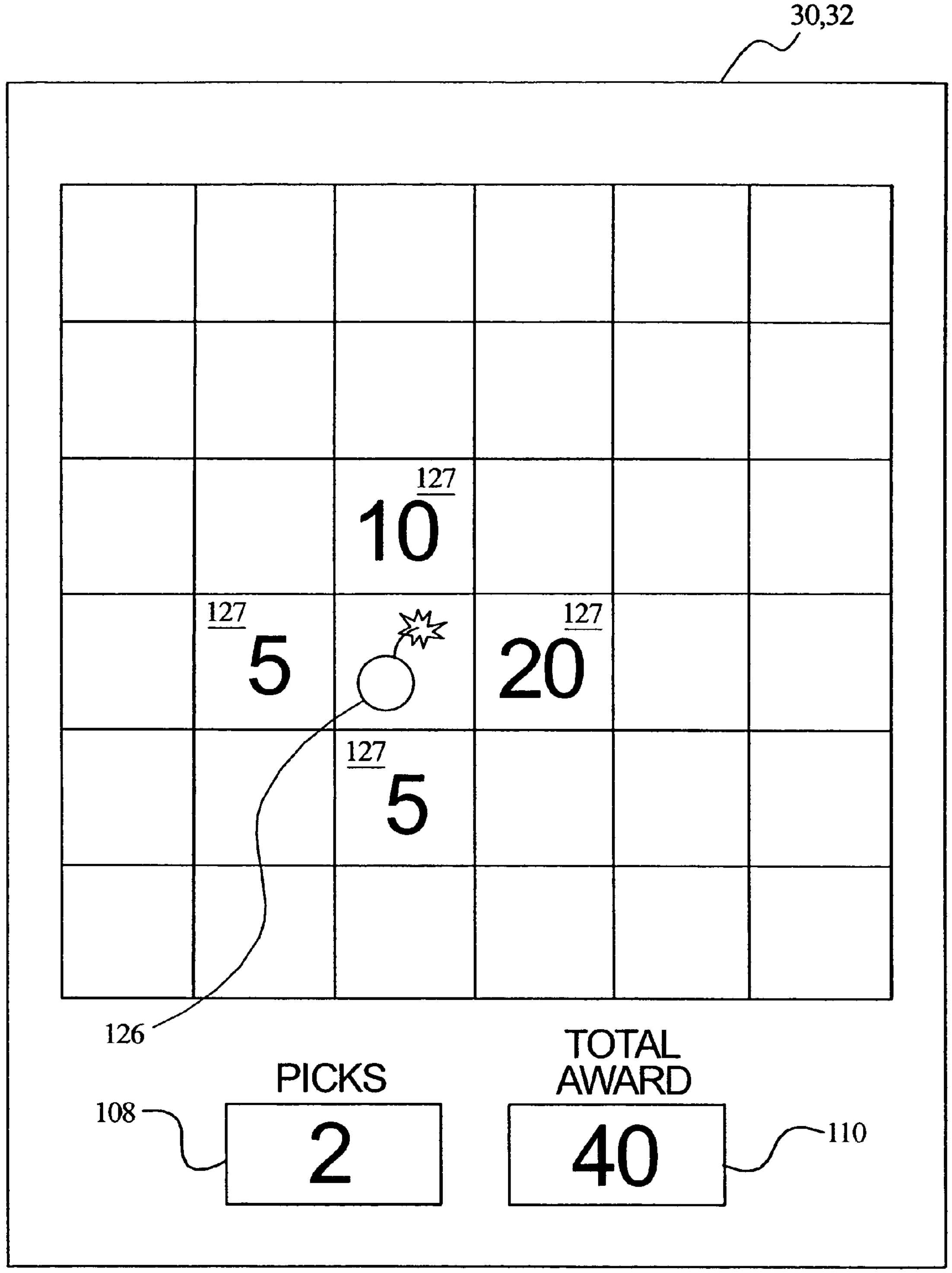
FIG. 6 is an enlarged front elevation view of a further alternative embodiment of the present invention wherein the display device illustrates a pick by a player that accumulates awards from a predefined area of selections.

In FIG. 6, yet another embodiment of the present invention is illustrated where the player picks a selection having an accumulated award 126 from the plurality of selections 102. The accumulated award reveals the awards 127 associated with the selections that are directly above, below, left and right of it. The selections diagonal from the accumulated award location are not revealed. Thus, the implementor may alter the number and location of selections that are related to a picked selection having an accumulated award. The player receives a total award of forty for obtaining the accumulated award in this example as shown by award display 110.

In one embodiment of the present invention, a player receives an extra award for completing a row, column or other predefined area in the plurality of selections 102. For example, if a player picks a number of selections 102 that complete a row in the selection matrix, the player receives an extra award in addition to the total awards associated with the revealed selections.

In another embodiment, the plurality of selections 102 include one or more terminators. In this embodiment, the gaming device enables a player to pick selections and obtain awards until the player picks a terminator. If the player picks a terminator, the game ends.

Figure 7:
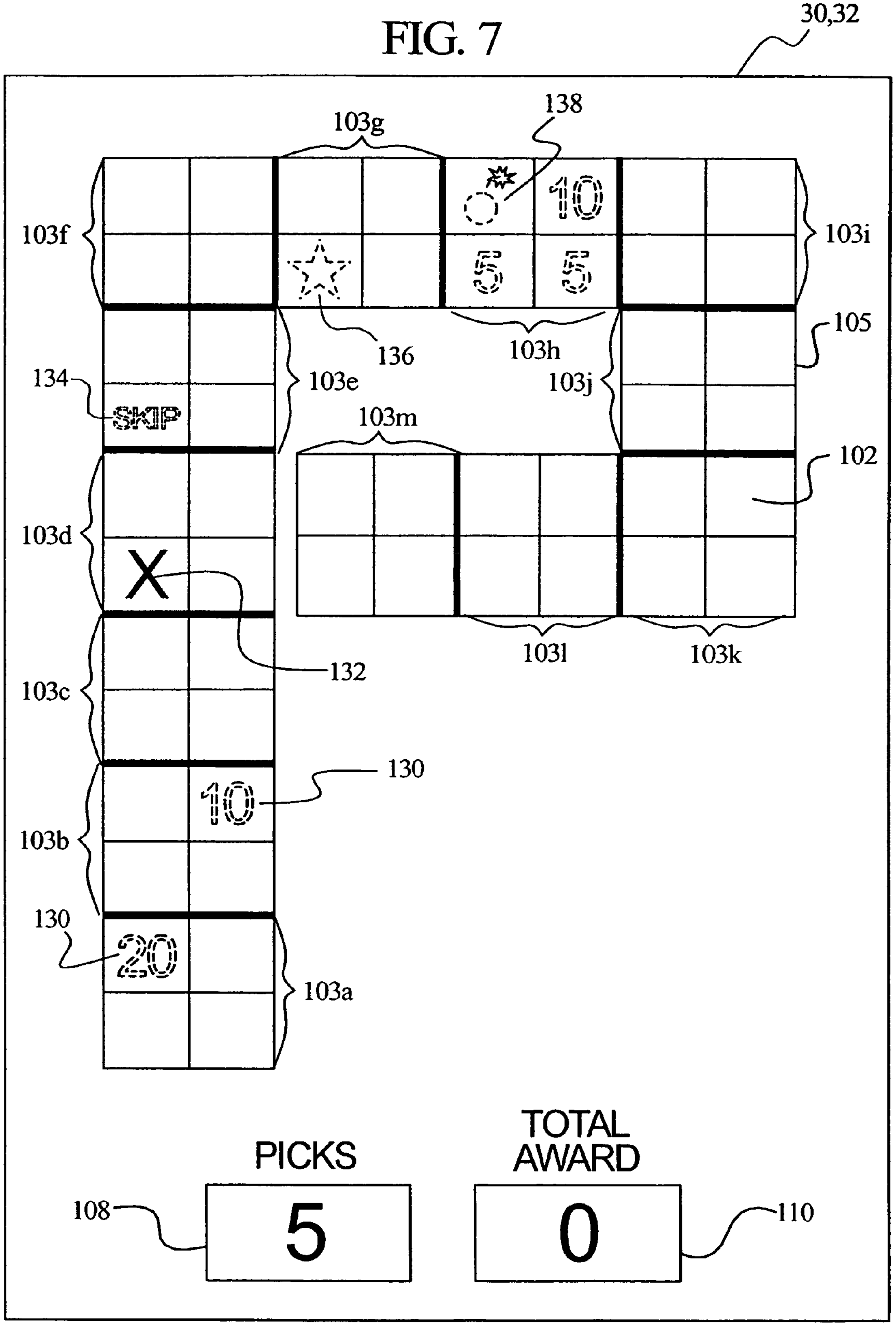
FIG. 7 is an enlarged front elevation view of another alternative embodiment of the present invention wherein the display device illustrates a plurality of selection sets having accumulated awards.

Now referring to FIG. 7, another embodiment of the present invention is shown where the plurality of selections are arranged in a pattern or design including a plurality of selection sets 103*a* to 103*m*. The pattern or design may be any pattern or design desired by an implementor and may include any number of selection sets 103. Each selection set 103 includes at least one and preferably a plurality of selections 102. The object of this embodiment is to proceed from the first selection set 103*a* to the last selection set 103*m* using a limited number of picks as shown in pick display 108. The selections include awards 130 and accumulated awards 138. The awards include free picks, spins or credits.

One embodiment includes terminators 132, promoters 134 and transformers 136 associated with the selections. As described in relation to the above embodiment, when a player picks a selection, the player receives an award associated with that selection. If the player picks a selection having an accumulated award 138, the player receives the awards associated with the selections 102 in the selection set of the picked selection. Thus, the selections in a selection set are related for determining the accumulated award. In one embodiment, the game reveals each selection in the respective selection set that includes the accumulated award selection. In another embodiment, each selection set has a plurality of selections and an accumulated award reveals the awards associated with the selections directly adjacent (or otherwise related) to the associated award selection.

If a terminator 132 is associated with a selection, the game ends when the terminator selection is picked by the player. However, if a player picks a transformer 136 before picking a terminator, the transformer changes the terminator into an accumulated award. If this occurs, the player receives the awards associated with the selections 102 in the selection set. In other words, the terminator becomes an accumulated award after it is changed by a transformer 136. In one embodiment, each transformer 136 changes one terminator 132. However, it is contemplated that a single transformer may change one or more terminators in a game.

The promoter 134 causes a player to skip a selection set and move closer to the end 103*m*. After a player skips a selection set, they receive another opportunity to pick a selection 102 in the next selection set. In one embodiment, the player does not lose a pick by obtaining the promoter. In one embodiment, the promoter skips only one set 103. However, it should be appreciated that a promoter may cause a player to skip one or more sets as desired by the implementor.

A player's goal is to reach the final selection set, which in this example is selection set 103*m*, while accumulating as many awards as possible before running out of picks. In one embodiment, the player receives a number of picks that enable that player to possibly reach the final selection set 103*m* if the player picks the correct selections to achieve this result. In another embodiment, the picks may be designated arbitrarily or randomly, such that a player may need one or more promoters to reach the final selection set because the player does not have enough picks at the beginning of the game to successfully pick a selection in each selection set to reach the final selection set.

In FIG. 7, the awards 130, terminators 132, promoters 134, transformers 136 and accumulated awards 138 are designated by certain characters, symbols or numbers. These designations are for illustration only and the game implementor may designate any suitable characters, symbols, numbers, pictures or sounds. Also, the awards 130, terminators 132, promoters 134, transformers 136 and accumulated awards 138 are preferably associated with probabilities such that any one of the selections has a greater probability of being assigned to a selection 102 than another selection. Furthermore, a player preferably receives an additional award if the player reaches the final selection set 103*m*. It is contemplated that the player may only receive the total of the awards for the player's selections in each set or a bonus award for making it to the final selection set. The bonus award may be extra spins, picks, games, multipliers or whatever award is desired by the game implementor.

Now referring to FIGS. 8A through 8E, an example is shown where a player picks selections from a plurality of selection sets 103*a* to 103*m* that are displayed to the player. The selection sets are arranged into a p-shaped pattern where each selection set includes a plurality of selections. The gaming device provides the player with a limited number of picks as shown in pick display 108. The player must use those picks to pick a selection 102 in each selection set to try to get to the final selection set 103*m*. After each pick, the player may receive an award associated with the picked selection, which is added to their total award for the game. As indicated above, the player may receive other designations such as a terminator, which ends the game. Thus, the player is provided with several alternatives and objectives in this embodiment, which increases the level of excitement and enjoyment of the game.

Figure 8A:
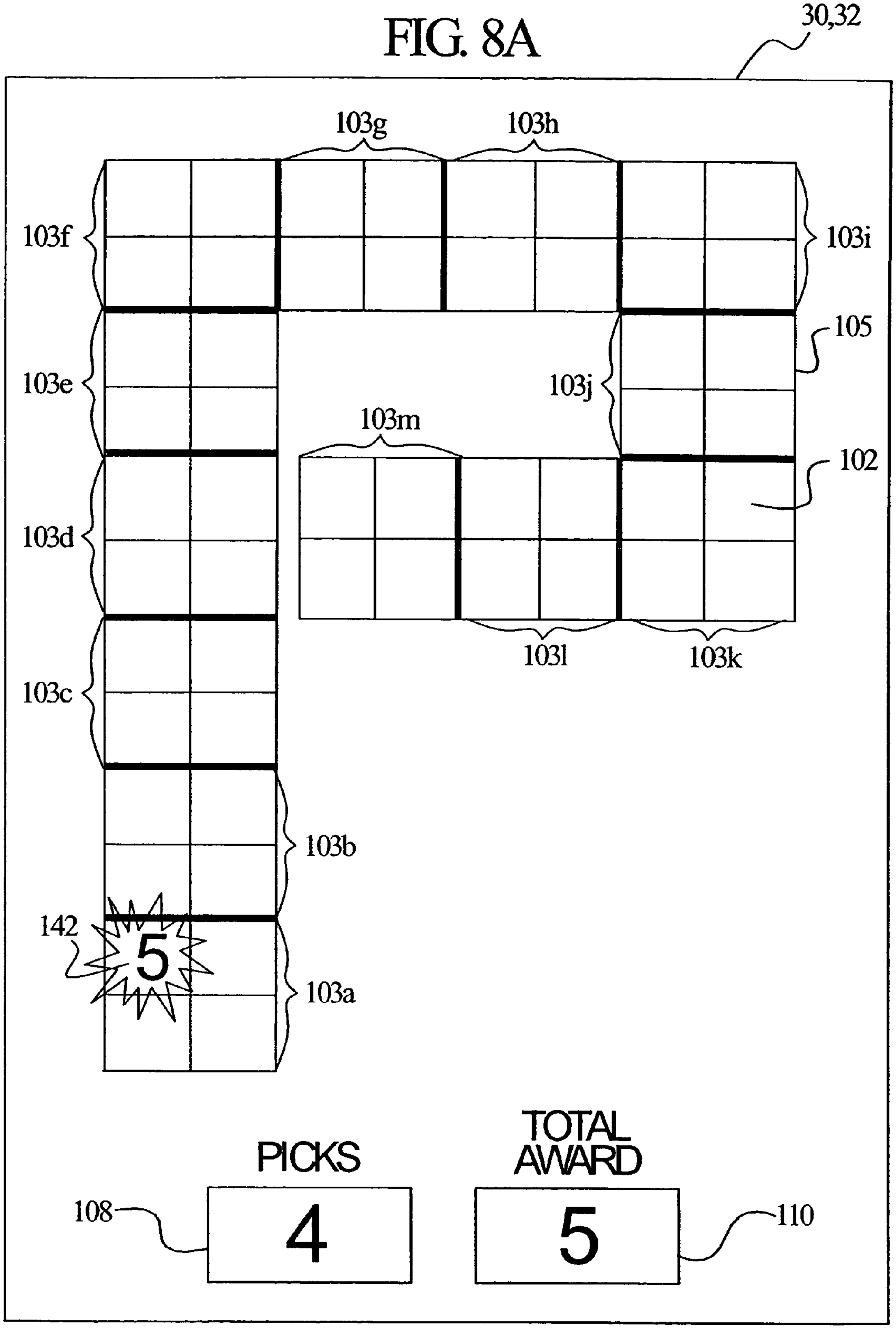
FIGS. 8A to 8F are enlarged front elevation views of a display device illustrating an example game of the alternative embodiment of FIG. 7 having a plurality of selection sets with accumulated awards.

Specifically referring to FIG. 8A, the gaming device provides the player with five picks to begin the game. The pattern includes thirteen selections sets, 103*a* to 103*m*, having four selections 102 in each set. Therefore, since the player only has five picks and there are thirteen selection sets in the game, the player must obtain promoters to reach the final selection set 103*m* in this game. The player's first pick is selection 142 in the first selection set 103*a*. The picked selection reveals an award of five, which is transferred to the award display 110. The player has four picks remaining to reach the final selection set 103*m* as shown in pick display 108.

Figure 8B:
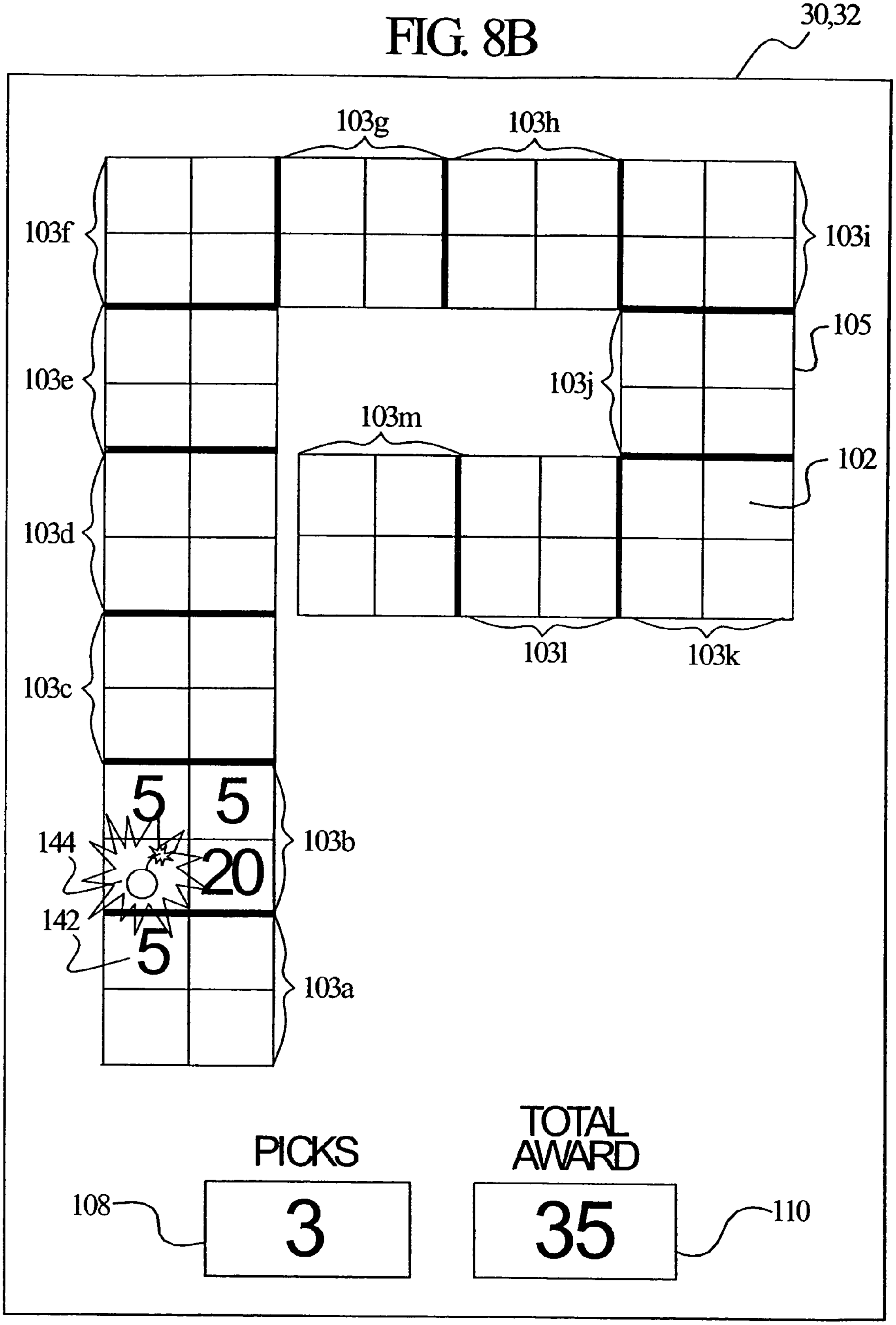

The player picks the second selection 144 in the second selection set 103*b* as illustrated in FIG. 8B. This selection reveals an accumulated award. In this example, the accumulated award equals the revealed awards associated with the selections in the same selection set 103*b* as the accumulated award. The player receives the accumulated award of thirty for this pick. The award is transferred to the award display 110 to give the player a total award of thirty-five for the game. Now with only three picks remaining as shown in pick display 108, the player must attempt to pick several promoters to reach the final selection set 103*m*.

Figure 8C:
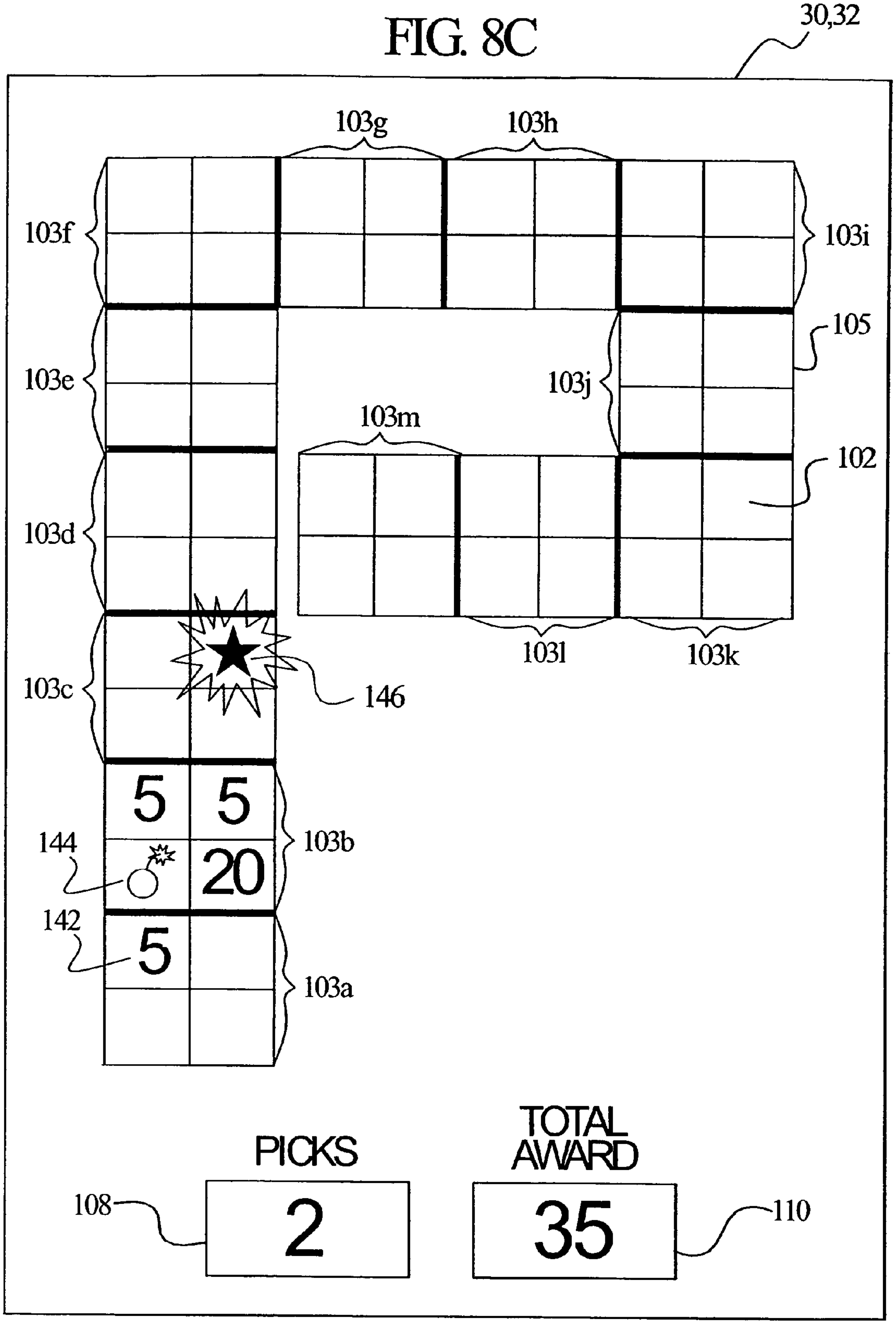

Referring now to FIG. 8C, the player makes their third pick in the game. The player picks selection 146 in the third selection set 103*c*. A transformer, designated by a star, is associated with this selection. The transformer does not have an award associated with it; however, it should be appreciated that a transformer may include any type of award as desired by the game implementor.

The transformer changes a terminator into an accumulated award. The transformer also acts like a free pick in the game by allowing the player to continue to pick selections even though the player picked a terminator. Normally, the terminator ends the game but with a transformer, the terminator reveals selections the same as an accumulated award. Until the player needs the transformer, it will be shown on display 30, 32 or on a separate display (not shown) to indicate that the player has a transformer or transformers to use in the game if the player should pick a terminator selection.

In one embodiment, the number of transformers obtained by a player is indicated on one of the display devices by displaying the same number of transformer symbols on the display device. For example, if the player selects two transformer symbols in a game, the display device will display two transformer symbols. If the player uses one of the transformers during the game, the display will display one transformer symbol to indicate to the player that the player only has one transformer remaining in the game. In another embodiment, the number of transformers obtained by the player is indicated by a transformer display that is similar to the pick display 108. In this embodiment, if the player obtains two transformers during the game, the transformer display will display the number two in the transformer display.

If the player obtains more than one transformer, each transformer is displayed to the player until the transformer is used in the game. The player's award total remains unchanged and the player now has two picks remaining in the game as shown in pick display 108.

Figure 8D:
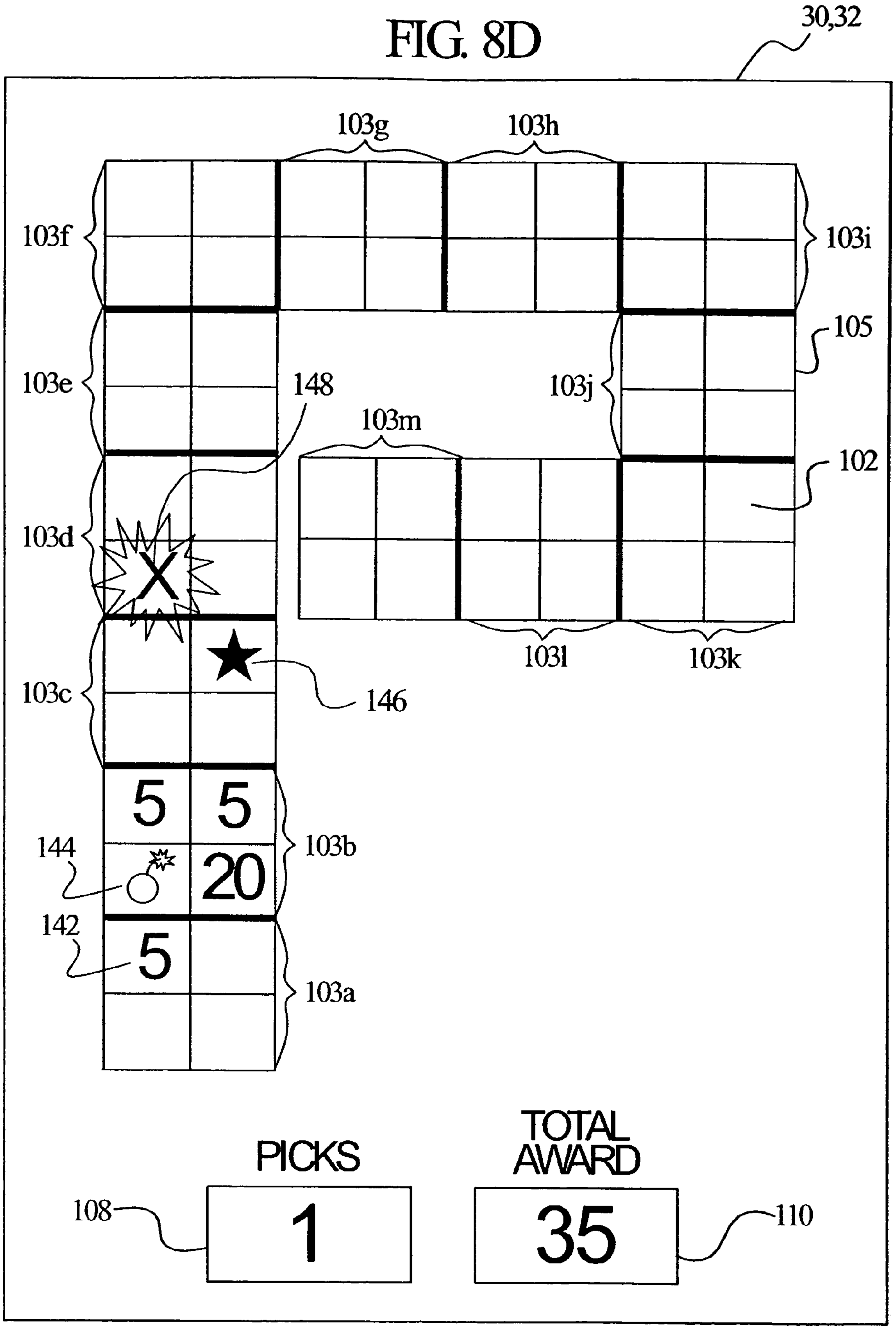
Figure 8E:
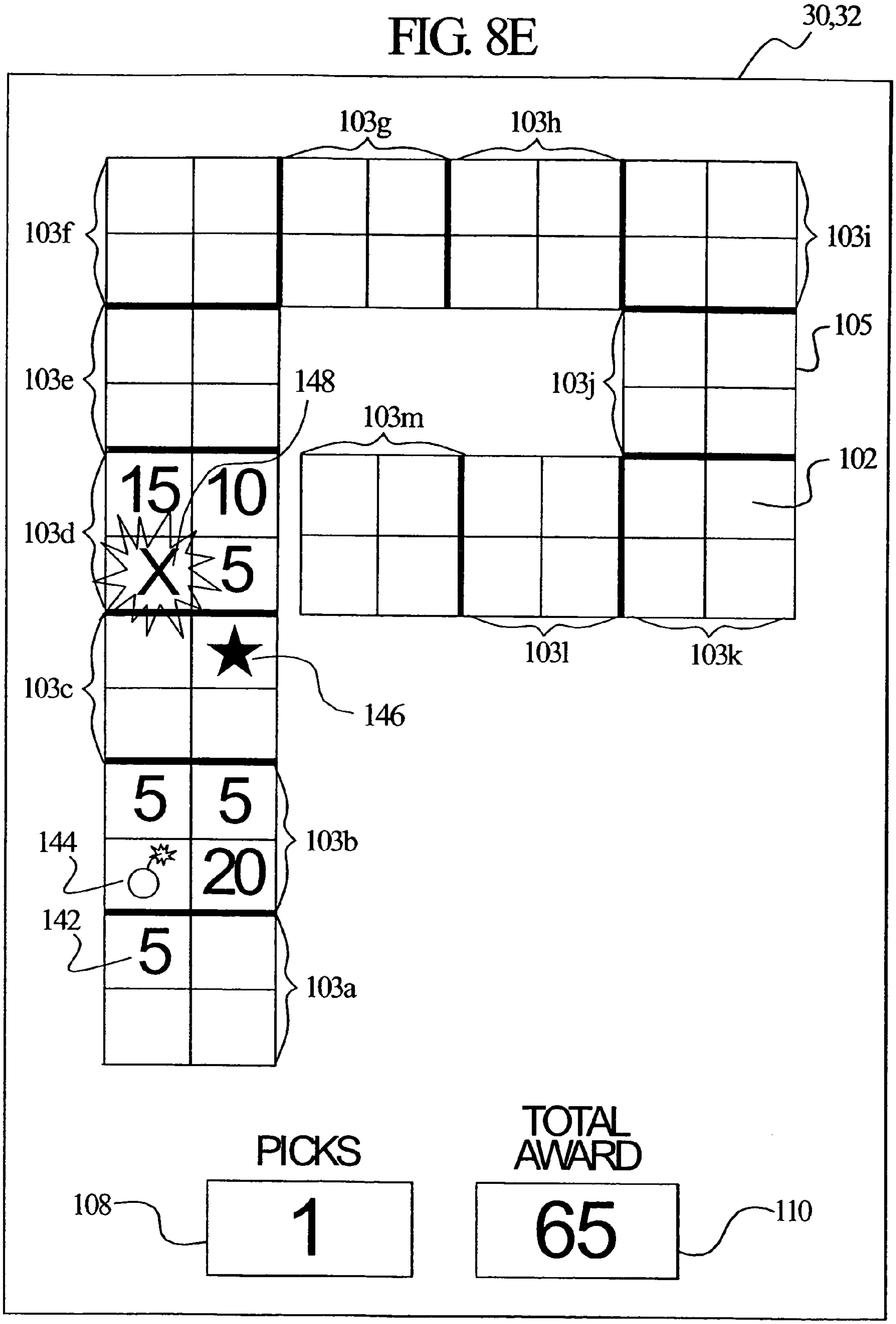

Referring to FIGS. 8D and 8E, the player picks selection 148 in the fourth selection set 103*d*. This selection reveals a terminator, which is represented by an "X" in this example. The transformer changes or transforms the terminator into an accumulated award as shown in FIG. 8E. Therefore, the other selections in selection set 103*d* are revealed to the player. The player receives an accumulated award of thirty, which is added to award display 110 to give a new total award of sixty-five. The player has one pick left in the game as indicated by pick display 108.

Figure 8F:
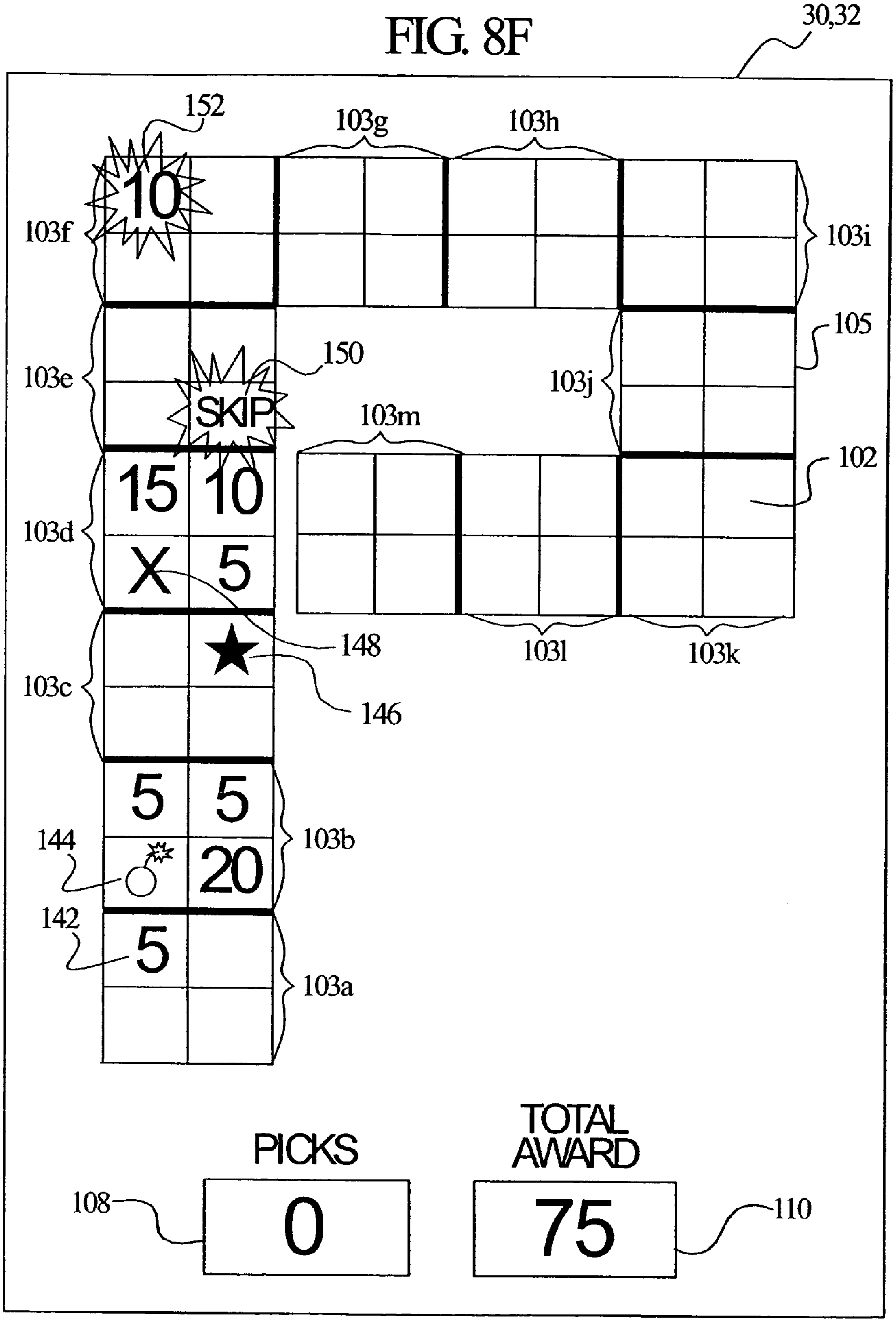

In FIG. 8F, the player uses the final selection in the game. The picked selection 150 reveals a promoter which is designated by the phrase "SKIP." The promoter acts like a free pick such that the promoter enables the player to skip the selection set 103*e* that includes the promoter. Now the player has an opportunity to pick a selection in the next selection set 103*f*. The player picks selection 152 that reveals an award of ten. The player has no more picks. The player ends the game with a total award of seventy-five as indicated by award display 110.

It should be appreciated that the processor of the gaming device preferably randomly assigns the awards, accumulated awards, terminators, transformers and promoters to the selections each time the game is played. The processor could make these assignments from tables, based on weighted probabilities, or distributions, or in any other suitable manner.

In another embodiment of the present invention, the value of the awards associated with the selections in the selection sets increase as a player progresses to each subsequent set in the selection set pattern. For example, the maximum award in the first selection set is one. Then, the maximum award in the second selection set is five. As the player advances to a new selection set, the award associated with each new selection set increases by a predetermined amount. The player advances through the pattern until the player reaches the last selection set in the pattern, where the maximum award is one hundred. It should be appreciated that the award may increase by a predetermined amount or by a random amount. In this embodiment, a player's excitement and entertainment level increases as the player advances through the pattern of selection sets. It should also be appreciated that the ranges of awards could vary and the average values in each set could vary.

In one alternative embodiment, the chance, percentage or probability of termination may vary. In one such embodiment, the chance, percentage or probability of termination increases as the player advances through each set or group of selections. In another such embodiment, the chance, percentage or probability of termination is randomly determined or selected from a pool of such percentages for each set or group of selections.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A method of operating a gaming device, said method comprising:

displaying a plurality of selections at a plurality of positions;

randomly associating a plurality of awards with said selections;

enabling a player to pick at least one of the selections;

providing at least one accumulated award randomly associated with at least one of said selections, wherein said accumulated award is based on at least two of said awards associated with at least two other selections which are positionally adjacent to the selection having the associated accumulated award, and wherein said accumulated award is based on less than all of the awards associated with the plurality of selections; and providing the player with any awards and accumulated awards associated with the selections picked by the player.

2. The method of claim 1, which includes determining said accumulated award as a sum of the awards associated with selections that are positionally adjacent to the selection having said accumulated award.

3. The method of claim 1, which includes displaying the selections in positions arranged in rows and columns.

4. The method of claim 3, which includes determining the accumulated award by summing the awards associated with the selections that are in diagonal positions from the selection having said accumulated award.

5. The method of claim 3, which includes determining the accumulated award by summing the awards associated with the selections that are at positions in the same row as the selection having said accumulated award.

6. The method of claim 3, which includes determining the accumulated award by summing the awards associated with the selections that are at positions in the same column as the selection having said accumulated award.

7. The method of claim 1, which includes randomly associating the awards and accumulated awards with said selections based on probabilities associated with said awards and accumulated awards.

8. The method of claim 1, which includes determining said accumulated award by summing the awards associated with selections including accumulated award selections that are positionally adjacent to said accumulated award, and wherein the selections include symbols.

9. The method of claim 1, which includes associating a plurality of accumulated awards with said positionally adjacent selections.

10. The method of claim 1, which includes associating one of the awards with the selection having said accumulated award, and wherein said accumulated award includes said award associated with said selection.

11. The method of claim 1, which includes associating at least one terminator with at least one of said selections, and ending further player picks of the selections after said selection having the terminator is picked.

12. The method of claim 1, which includes providing a number of picks, said number being at least two, and enabling the player to pick the selections until no picks remain.

13. The method of claim 1, which is provided through a data network.

14. The method of claim 13, wherein the data network is an internet.

15. A method of operating a gaming device, said method comprising:

initiating a game;

displaying a plurality of selection sets in said game, each said plurality of selection sets including at least one selection, and a plurality of said selection sets each including a plurality of selections;

randomly associating a plurality of awards with said selections;

providing at least one accumulated award randomly associated with at least one of said selections, wherein said accumulated award is based on at least two of said awards associated with at least two other selections which are positionally adjacent to the selection having the associated accumulated award, and wherein said accumulated award is based on less than all of the awards associated with the plurality of selections; and providing the accumulated award to a player if said selection associated with said accumulated award is picked.

16. The method of claim 15, which includes determining the accumulated award by summing all of the awards associated with the selections in the selection set of the selection having the accumulated award.

17. The method of claim 15, which includes associating at least one terminator with at least one of said selections in at least one of the selection sets, and ending further picks of the selections after said selection having said terminator is picked.

18. The method of claim 15, which includes enabling the player to pick said selections.

19. The method of claim 15, which includes providing a number of picks, said number being at least two, and enabling the player to pick selections from each selection set until no picks remain.

20. The method of claim 15, wherein providing a plurality of selection sets includes varying the average value of the awards associated with the selection sets.

21. The method of claim 20, which includes increasing the average value of the awards associated with the selection sets with each subsequent selection set.

22. The method of claim 15, which is provided through a data network.

23. The method of claim 22, wherein the data network is an internet.

24. A method of operating a gaming device, said method comprising:

providing a game operable upon a wager by a player;

after an occurrence of a triggering event associated with said game, displaying at least one selection set, each selection set including a plurality of selections displayed at a plurality of positions;

randomly associating a plurality of awards with the selections in the selection sets;

providing at least one accumulated award randomly associated with at least one selection in one of the selection sets, wherein said accumulated award is based on at least two of the awards associated with at least two other selections in said selection set which are positionally adjacent to the selection associated with said accumulated award, and wherein said accumulated award is based on less than all of the awards associated with the plurality of selections; and providing the accumulated award to a player if said selection associated with said accumulated award is picked.

25. The method of claim 24, which is provided through a data network.

26. The method of claim 25, wherein the data network is an internet.

27. A method of operating a gaming device, said method comprising:

displaying a plurality of selections at a plurality of positions;

enabling a player to pick at least one of the selections;

randomly associating a plurality of awards with said selections;

providing at least one accumulated award randomly associated with at least one of said selections, wherein said accumulated award is based on at least two of said awards associated with at least two other selections which are positionally adjacent to the selection having the associated accumulated award, and wherein said accumulated award is based on less than all of the awards associated with the plurality of selections; and providing the player with any awards and accumulated awards associated with the selections picked by the player.

28. The method of claim 27, which includes determining said accumulated award by summing the awards associated with selections that are positionally adjacent to the selection having said accumulated award.

29. The method of claim 27, which includes displaying the selections in positions arranged in rows and columns.

30. The method of claim 29, which includes determining the accumulated award by summing the awards associated with the selections that are in diagonal positions from the selection having said accumulated award.

31. The method of claim 29, which includes determining the accumulated award by summing the awards associated with the selections that are at positions in the same row as the selection having said accumulated award.

32. The method of claim 29, which includes determining the accumulated award by summing the awards associated with the selections that are at positions in the same column as the selection having said accumulated award.

33. The method of claim 27, which includes randomly associating the awards and accumulated awards with said selections based on probabilities associated with said awards and accumulated awards.

34. The method of claim 27, which includes determining said accumulated award by summing the awards associated with selections including accumulated award selections that are positionally adjacent to said accumulated award, and wherein said selections include symbols.

35. The method of claim 27, which includes providing a plurality of accumulated awards associated with said positionally adjacent selections.

36. The method of claim 27, which includes providing an award associated with the selection having said accumulated award, and wherein said accumulated award includes said award associated with said selection.

37. The method of claim 27, which includes associating at least one terminator with at least one of said selections, and ending further player picks of the selections if the selection having the terminator is picked.

38. The method of claim 27, which includes providing a plurality of picks, and enabling the player to pick the selections until no picks remain.

39. The method of claim 27, which is provided through a data network.

40. The method of claim 38, wherein the data network is an internet.

41. A method of operating a gaming device, said method comprising:

displaying a plurality of selection sets, each selection set including at least one selection and a plurality of said selection sets including a plurality of selections;

associating a plurality of awards with said selections;

providing at least one accumulated award associated with at least one of said selections, wherein said accumulated award is based on at least two of said awards associated with at least two other selections in the selection set which are positionally adjacent to the selection having the associated accumulated award, and wherein said accumulated award is based on less than all of the awards associated with the plurality of selections; and providing the accumulated award to a player if said selection associated with said accumulated award is picked.

42. The method of claim 41, which includes determining said accumulated award by summing all of said awards associated with said selections in the selection set of the selection having the accumulated award.

43. The method of claim 41, which includes associating at least one terminator with at least one of said selections in at least one of the selection sets, and ending further picks after the said selection having said terminator is picked.

44. The method of claim 41, which includes enabling the player to pick at least one of the selections.

45. The method of claim 41, which includes providing a plurality of picks, and enabling the player to pick one selection from individual selection sets until there are no picks remaining.

46. The method of claim 41, which includes varying the average value of the awards associated with the selection sets.

47. The method of claim 46, which includes increasing the average value of the awards associated with the selection sets with each subsequent selection set.

48. The method of claim 41, which is provided through a data network.

49. The method of claim 48, wherein the data network is an internet.

50. A method of operating a gaming device, said method comprising:

displaying at least one selection set, each selection set including a plurality of selections displayed at a plurality of positions;

associating a plurality of awards with the selections in the selection sets;

providing at least one accumulated award associated with at least one selection in one of the selection sets, wherein said accumulated award is based on at least two of the awards associated with at least two other selections in said selection set which are positionally adjacent to the selection associated with said accumulated award, and wherein said accumulated award is based on less than all of the awards associated with the plurality of selections; and providing the accumulated award to a player if said selection associated with said accumulated award is picked.

51. The method of claim 50, which is provided through a data network.

52. The method of claim 51, wherein the data network is an internet.

53. A gaming device operated under control of a processor, said gaming device comprising:

a display device controlled by the processor;

a plurality of sequentially arranged selection sets adapted to be concurrently displayed by said display device to form a pattern of said selection sets, each selection set including a plurality of selections;

a plurality of awards associated with said plurality of selections;

a plurality of picks provided to the player, wherein the player can sequentially pick selections from the sequentially arranged selection sets until there are no picks remaining, the number of said picks being less than the number of said selection sets;

at least one promoter associated with at least one of said selections in at least one of said selection sets before a final one of the selection sets, wherein if the selection having said promoter is picked, the processor advances the player to a next selection set without utilizing one of said plurality of picks; and an additional award provided to the player if the player advances to the final selection set.

54. The gaming device of claim 53, wherein a probability of picking said selection having said promoter decreases with each subsequent selection set.

55. The gaming device of claim 53, wherein the average value of the awards associated with the selection sets are different.

56. The gaming device of claim 53, wherein the average value of the awards associated with the selection sets increases with each subsequent selection set.

57. A method of operating a gaming device, said method comprising:

displaying concurrently a plurality of sequentially arranged selection sets to form a pattern of said selection sets, each selection set including a plurality of selections;

associating a plurality of awards with said selections;

providing a number of picks and enabling the player to sequentially pick selections from the subsequently arranged selection sets until there are no picks remaining, the number of said picks being less than the number of said selection sets;

associating at least one promoter with at least one of said selections in at least one of said selection sets before a final one of the selection sets, and after said selection having said promoter is picked, advancing the player to the next selection set without utilizing one of said plurality of picks; and providing an additional award if the player advances to the final selection set.

58. The method of claim 57, wherein a probability of picking said selection having said promoter decreases with each subsequent selection set.

59. The method of claim 57, wherein the average value of the awards associated with the selection sets are different.

60. The method of claim 59, which includes increasing the average value of the awards associated with the selection sets for each subsequent selection set.

61. The method of claim 57, which is provided through a data network.

62. The method of claim 61, wherein the data network is an internet.

63. A gaming device operated under control of a processor, said gaming device comprising:

a display device controlled by the processor;

a plurality of sequentially arranged selection sets adapted to be concurrently displayed by said display device to form a pattern of said selection sets, each selection set including a plurality of selections;

a plurality of awards associated with said plurality of selections, wherein the average value of the awards associated with each selection set increases with each subsequent selection set;

a plurality of picks provided to the player, wherein the player can sequentially pick selections from the sequentially arranged selection sets until there are no picks remaining, the number of said picks being less than the number of said selection sets; and at least one promoter associated with at least one of said selections in at least one of said selection sets before a final one of the selection sets, wherein if the selection having said promoter is picked, the processor advances the player to a next selection set without utilizing one of said plurality of picks.

64. The gaming device of claim 63, wherein a probability of picking said selection having said promoter decreases with each subsequent selection set.

65. A method of operating a gaming device, said method comprising:

displaying concurrently a plurality of sequentially arranged selection sets to form a pattern of said selection sets, each selection set including a plurality of selections;

associating a plurality of awards with said selections, wherein the average value of the awards associated with each selection set increases with each subsequent selection set;

providing a number of picks and enabling the player to sequentially pick selections from the subsequently arranged selection sets until there are no picks remaining, the number of said picks being less than the number of said selection sets; and associating at least one promoter with at least one of said selections in at least one of said selection sets before a final one of the selection sets, and after said selection having said promoter is picked, advancing the player to the next selection set without utilizing one of said plurality of picks.

66. The method of claim 65, wherein the probability of picking said selection having said promoter decreases with each subsequent selection set.

67. The method of claim 65, which is provided through a data network.

68. The method of claim 67, wherein the data network is an internet.

69. A method of operating a gaming device, said method comprising:

displaying a generated plurality of selections at a plurality of positions;

associating a plurality of awards with said selections;

enabling a player to pick a plurality of the selections;

providing at least one accumulated award associated with at least one of said selections, wherein said accumulated award is based on at least two of said awards associated with at least two other selections which are positionally adjacent to the selection having the associated accumulated award;

if the player picks a selection having a transformer and then picks a selection having a terminator that would end further player picks of said selections, changing said terminator into an accumulated award; and providing the player with any awards and accumulated awards associated with the selections picked by the player.

70. The method of claim 69, which includes determining said accumulated award as a sum of the awards associated with selections that are positionally adjacent to the selection having said accumulated award.

71. The method of claim 69, which includes displaying the selections in positions arranged in rows and columns.

72. The method of claim 71, which includes determining the accumulated award by summing the awards associated with the selections that are in diagonal positions from the selection having said accumulated award.

73. The method of claim 71, which includes determining the accumulated award by summing the awards associated with the selections that are at positions in the same row as the selection having said accumulated award.

74. The method of claim 71, which includes determining the accumulated award by summing the awards associated with the selections that are at positions in the same column as the selection having said accumulated award.

75. The method of claim 69, which includes associating the awards and accumulated awards with said selections based on probabilities associated with said awards and accumulated awards.

76. The method of claim 69, wherein each of said selections include symbols, and which includes determining said accumulated award based on the awards associated with selections including accumulated award selections that are positionally adjacent to said accumulated award.

77. The method of claim 69, which includes associating a plurality of accumulated awards with said positionally adjacent selections.

78. The method of claim 69, which includes associating one of the awards with the selection having said accumulated award, and wherein said accumulated award includes said award associated with said selection.

79. The method of claim 69, which includes associating at least one terminator with one of said selections, and ending further player picks of the selections after said selection having said terminator is picked.

80. The method of claim 69, which includes providing a plurality of picks and enabling the player to pick the selections until no picks remain.

81. The method of claim 69, which is provided through a data network.

82. The method of claim 81, wherein the data network is an internet.

83. A method of operating a gaming device, the method comprising:

displaying a plurality of selection sets, each selection set including a plurality of selections;

associating a plurality of awards with said selections;

enabling a player to pick a plurality of the selections;

providing at least one accumulated award associated with at least one of said selections in one of said selection sets, wherein said accumulated award is based on at least two of said awards associated with at least two other selections in said selection set which are directly positionally adjacent to the selection having said accumulated award;

associating at least one terminator with at least one of said selections in at least one of the selection sets, and ending further player picks of the selections after said selection having the terminator is picked; and associating at least one transformer with at least one of said selections in at least one of the selection sets, wherein if a player picks one of the selections having said transformer and subsequently picks one of the selections having said terminator, changing said terminator into an accumulated award.

84. The method of claim 83, which includes determining said accumulated award as a sum of all awards associated with selections in the selection set having said accumulated award.

85. The method of claim 83, which includes associating at least one promoter with at least one of said selections in one of said selection sets, and advancing the player to a subsequent selection set after said selection having the promoter is picked.

86. The method of claim 83, wherein the average value of the awards associated with the selection sets are different.

87. The method of claim 83, which includes increasing the average value of the awards associated with the selection sets with each subsequent selection set.

88. The method of claim 83, which is provided through a data network.

89. The method of claim 88, wherein the data network is an internet.

90. A method of operating a gaming device, the method comprising:

displaying a plurality of selection sets, each selection set including a plurality of selections;

enabling a player to pick the selections;

associating a plurality of awards with said selections;

providing at least one accumulated award associated with at least one selection in one of said selection sets, wherein said accumulated award is based on at least two of said awards associated with at least two other selections in said selection set having said accumulated award;

associating at least one terminator with at least one of said selections in one of the selection sets; and associating at least one transformer with at least one of said selections in at least one of the selection sets, wherein if the player picks a selection having said transformer and subsequently picks a selection having said terminator, changing said terminator into an accumulated award.

91. The method of claim 90, which is provided through a data network.

92. The method of claim 91, wherein the data network is an internet.

93. A method of operating a gaming device, the method comprising:

displaying a plurality of selections;

enabling a player to pick a plurality of the selections;

associating a plurality of awards with said selections;

providing at least one accumulated award associated with at least one of said selections, wherein said accumulated award is based on at least two of said awards associated with at least two other selections which are related to the selection having the associated accumulated award;

providing the player with awards associated with the selections picked by the player and any accumulated award associated with the selections picked by the player;

associating at least one terminator with at least one of said selections in one of the selection sets; and associating at least one transformer with at least one of said selections in at least one of the selection sets, wherein if the player picks the selection having said transformer and subsequently picks the selection having said terminator, changing said terminator into one of the accumulated awards.

94. The method of claim 93, which is provided through a data network.

95. The method of claim 94, wherein the data network is an internet.

96. A method of operating a gaming device, the method comprising:

displaying a plurality of selections sets, each selection set including a plurality of selections;

enabling a player to pick a plurality of selections;

associating a plurality of awards with said selections;

providing at least one accumulated award associated with at least one selection in one of said selection sets, wherein said accumulated award is based on at least two of said awards associated with at least two other selections in said selection set having said accumulated award;

associating at least one promoter with at least one of said selections in at least one of said selection sets, wherein if the selection having said promoter is picked, advancing the player to the next selection set without utilizing one of the picks;

associating at least one terminator with at least one of said selections in one of the selection sets, and ending further player picks of the selections after said selection having said terminator is picked; and associating at least one transformer with at least one of said selections in at least one of the selection sets, wherein if the player picks the selection having said transformer and subsequently picks the selection having said terminator, changing said terminator into the accumulated award.

97. The method of claim 96, which is provided through a data network.

98. The method of claim 97, wherein the data network is an internet.

99. A method of operating a gaming device, the method comprising:

displaying at least one selection set, each selection set including a plurality of selections;

associating a plurality of awards with said selections;

associating at least one accumulated award with at least one selection in the selection set, wherein said accumulated award is based on at least two awards associated with at least two other selections in the selection set which are positionally adjacent with the selection associated with said accumulated award;

associating at least one terminator with at least one of said selections in one of the selection sets, and ending further player picks of the selections after said selection having said terminator is picked; and associating at least one transformer with at least one of said selections in at least one of the selection sets, wherein if the player picks the selection having said transformer and subsequently picks the selection having said terminator, changing said terminator into the accumulated award.

100. The method of claim 99, which is provided through a data network.

101. The method of claim 100, wherein the data network is an internet.

* * * * *